United States Patent
Eilert et al.

(10) Patent No.: US 6,442,583 B1
(45) Date of Patent: *Aug. 27, 2002

(54) MULTI-SYSTEM RESOURCE CAPPING

(75) Inventors: Catherine Krueger Eilert, Wappingers Falls; Bernard Roy Pierce, Poughkeepsie, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,763

(22) Filed: May 1, 1997

Related U.S. Application Data

(63) Continuation of application No. 08/383,042, filed on Feb. 3, 1995, now abandoned.

(51) Int. Cl.[7] .................................................. G06F 9/00
(52) U.S. Cl. ........................ 709/104; 709/105; 709/103
(58) Field of Search ............................... 395/672, 674, 395/675, 673, 200.56, 200.54, 200.59; 709/102, 104, 105, 103, 226, 224, 229

(56) References Cited

U.S. PATENT DOCUMENTS

| | | | | |
|---|---|---|---|---|
| 5,031,089 A | * | 7/1991 | Liu et al. ..................... | 364/200 |
| 5,210,872 A | * | 5/1993 | Ferguson et al. ............ | 395/650 |
| 5,421,011 A | * | 5/1995 | Camillone et al. .......... | 395/650 |
| 5,446,737 A | * | 8/1995 | Cidon et al. ................ | 370/85.5 |
| 5,473,773 A | * | 12/1995 | Aman et al. ................. | 395/650 |
| 5,504,894 A | * | 4/1996 | Ferguson et al. ........... | 395/650 |
| 5,522,070 A | * | 5/1996 | Sumimoto .................. | 395/650 |
| 5,537,542 A | * | 7/1996 | Eilert et al. ............. | 395/184.01 |
| 5,550,982 A | * | 8/1996 | Long et al. ................. | 395/200 |
| 5,572,526 A | * | 11/1996 | Cidon et al. ................ | 370/85.5 |
| 5,603,029 A | * | 2/1997 | Aman et al. ................. | 295/675 |
| 5,619,695 A | * | 4/1997 | Arbabi et al. ............... | 395/670 |
| 5,713,013 A | * | 1/1998 | Black ......................... | 395/602 |
| 5,778,320 A | * | 7/1998 | Drozt et al. ................ | 455/509 |
| 5,819,047 A | * | 10/1998 | Bauer et al. ........... | 395/200.59 |
| 5,881,238 A | * | 3/1999 | Aman et al. ........... | 395/200.56 |
| 5,925,102 A | * | 7/1999 | Eilert et al. ................. | 709/226 |
| 5,956,734 A | * | 9/1999 | Schmuck et al. ........... | 707/205 |

FOREIGN PATENT DOCUMENTS

| | | | |
|---|---|---|---|
| EP | 0346039 | 12/1989 | |
| EP | 0359241 | 3/1990 | |
| EP | 92311301.3 | 6/1993 | ............. G06F/9/46 |
| GB | 2210482 | 6/1989 | |
| JP | 06019861 A | 1/1994 | ........... G06F/15/16 |

OTHER PUBLICATIONS

A. Bettison et al, "Limits—A System for UNIX Resource Administration", ACM, pp. 686–692, 1989.*
J. Huang, "Resource Management for Continuous Multimedia Database Applications", IEEE, pp. 46–54, 1994.*

(List continued on next page.)

*Primary Examiner*—St. John Courtenay, III
*Assistant Examiner*—Sue Lao
(74) *Attorney, Agent, or Firm*—Lawrence D. Cutter, Esq.; William A. Kinnaman, Jr. Esq.; Heslin Rothenberg Farley & Mesiti P.C.

(57) ABSTRACT

A method for managing a workload distributed across data processing systems in accordance with a common processor consumption standard, including the steps of measuring the processor consumption of the work units to create local processor consumption data; sending the local processor consumption data to at least one other system; receiving processor consumption data from at least one other system to create remote processor consumption data; and adjusting at least one of the system control parameters to modify the remote processor consumption and the local processor consumption of the work units to achieve the common processor consumption standard is provided. Also provided is an apparatus according to the method.

29 Claims, 18 Drawing Sheets

OTHER PUBLICATIONS

D. Anderson, "Metascheduling for Continuous Media", ACM, vol. 11, No. 3, pp. 226–252, Aug. 1993.*

D. Fergoson, et al, "Satisfying Response Time Goals in Transaction Processing Systems", IEEE, pp. 138–147, 1993.*

Application S/N 08/222,755, "Apparatus and Method for Managing a Data Processing System Workload According to Two or More Distinct Processing Goal Types" by J.D. Aman et al., filed Apr. 4, 1994.

Application S/N 08/222,752, "Apparatus and Method for Managing Server Workload According to Client Performance Goals in a Client/Server Data Processing System" by C. Eilert et al., filed Apr. 4, 1994.

Application S/N 08/383,168, "Apparatus and Method for Managing a Distributed Data Processing System Workload According to a Plurality of Distinct Processing Goal Types", by C. Eilert et al., Filed Feb. 3, 1995.

Anonymous, "Goal Oriented Central Processing Unit Scheduling," IBM Technical Disclosure Bulletin, vol. 36, No. 12, Dec., 1993, pp. 425–432 (XP000419021).

Anonymous, "Method for Workload Performance Measurement," IBM Technical Disclosure Bulletin, vol. 34, No. 6, Nov. 1991, pp. 387–389 (XP000212786).

"Task migration algorithm for load balancing in a distribut" System Science, 1989 Annual Hawaii Int'l, IEEE.*

"Dynamic Load Balancing in a distributed System Vsz a Send" Local computer Networks, 1988, 13th Conference, IEEE.*

* cited by examiner

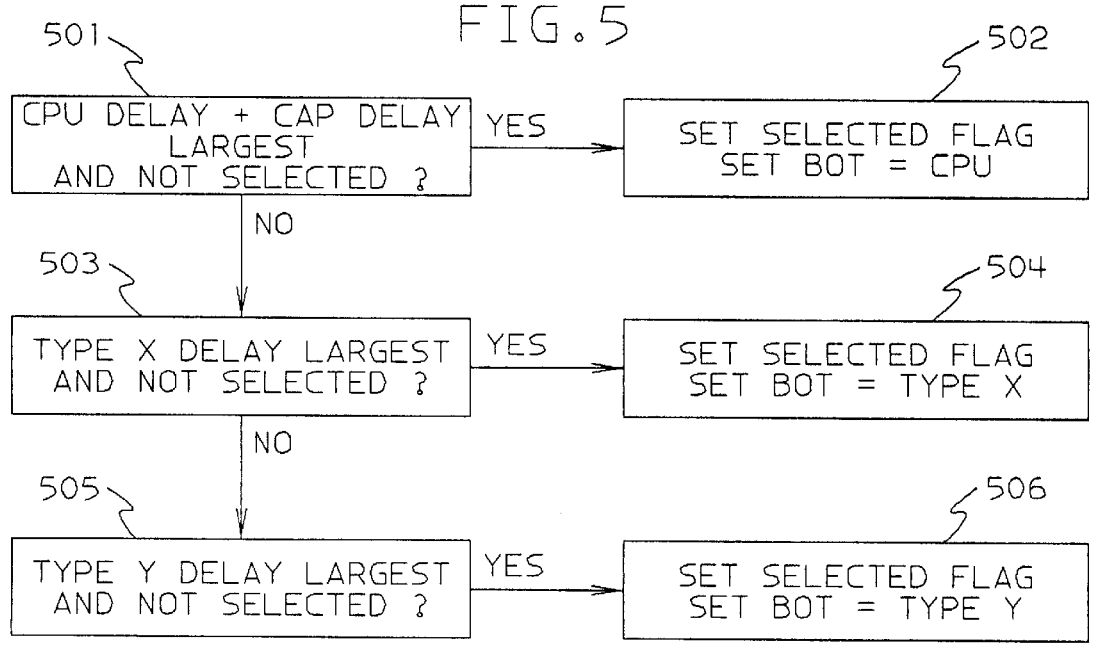

| MAXIMUM DEMAND AVAILABLE RATIO | ACHIEVABLE DEMAND PERCENTAGE |
|---|---|
| 0.00 | 0 |
| 0.50 | 50 |
| 0.75 | 67 |
| 1.00 | 80 |
| 2.00 | 95 |
| 4.00 | 100 |

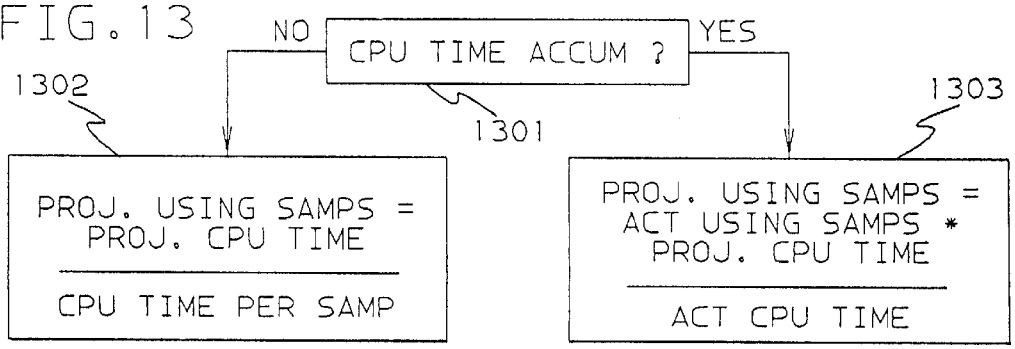
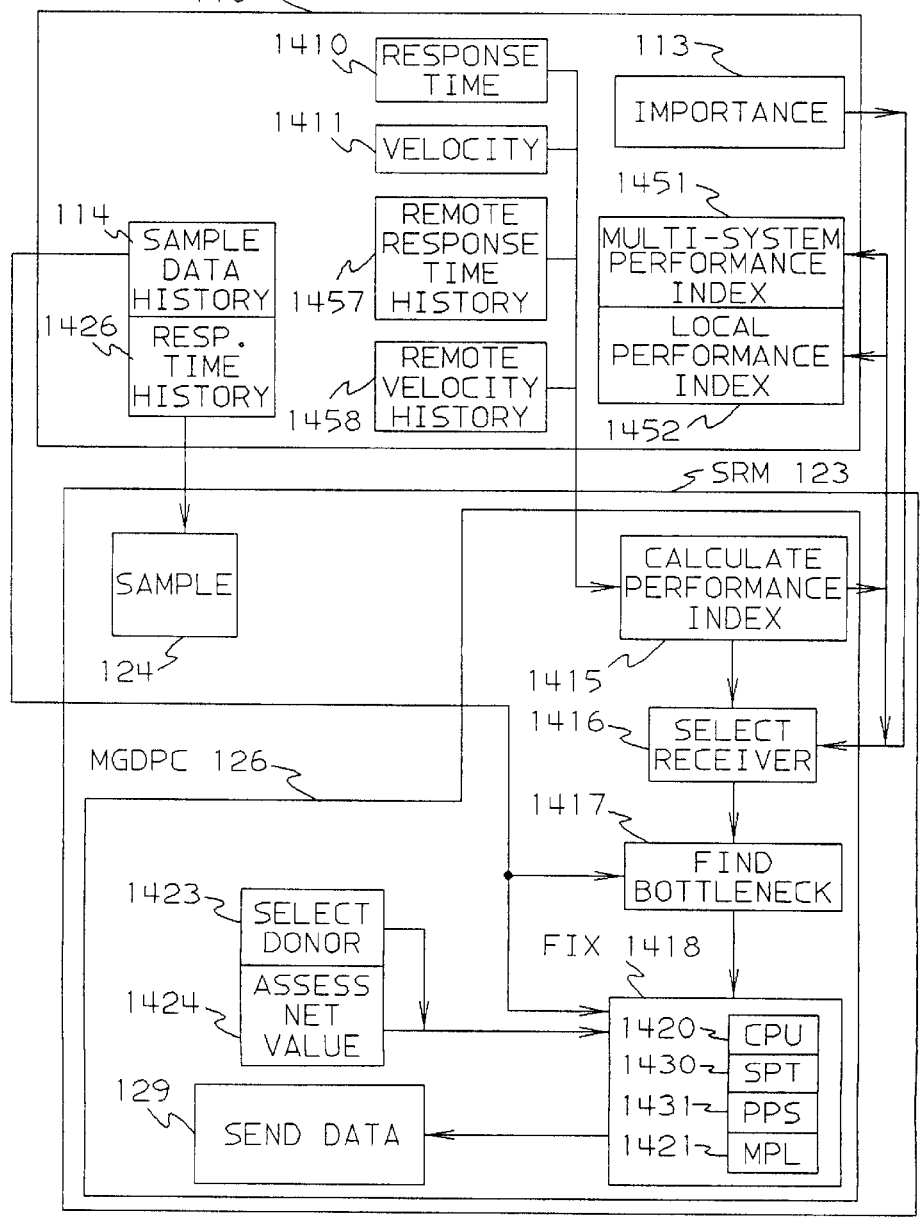

FIG. 15

GROUP TABLE ENTRY
117

| | |
|---|---|
| 118 | GROUP NAME |
| 119 | MAXIMUM |
| 1502 | CAP SLICES WINDOW (6 WINDOW PANES) |
| 1503 | CURRENT WINDOW PANE INDEX |
| 1504 | LOCAL SERVICE WINDOWS BY IMPORTANCE (6 WINDOW PANES) |
| 121 | REMOTE SERVICE WINDOWS BY IMPORTANCE (6 WINDOW PANES) |
| 1506 | LOCAL AND TOTAL SERVICE OVER WINDOW BY IMPORTANCE (TS) |
| 1507 | TOTAL SERVICE OVER WINDOW |
| 1508 | LOCAL SYSTEM HAS WORK AT EACH IMPORTANCE (7 LEVELS OF IMPORTANCE) |
| 1509 | NUMBER OF REMOTE SYSTEMS THAT HAVE WORK AT EACH IMPORTANCE |
| 122 | 64-BIT CAP SLICE PATTERN |

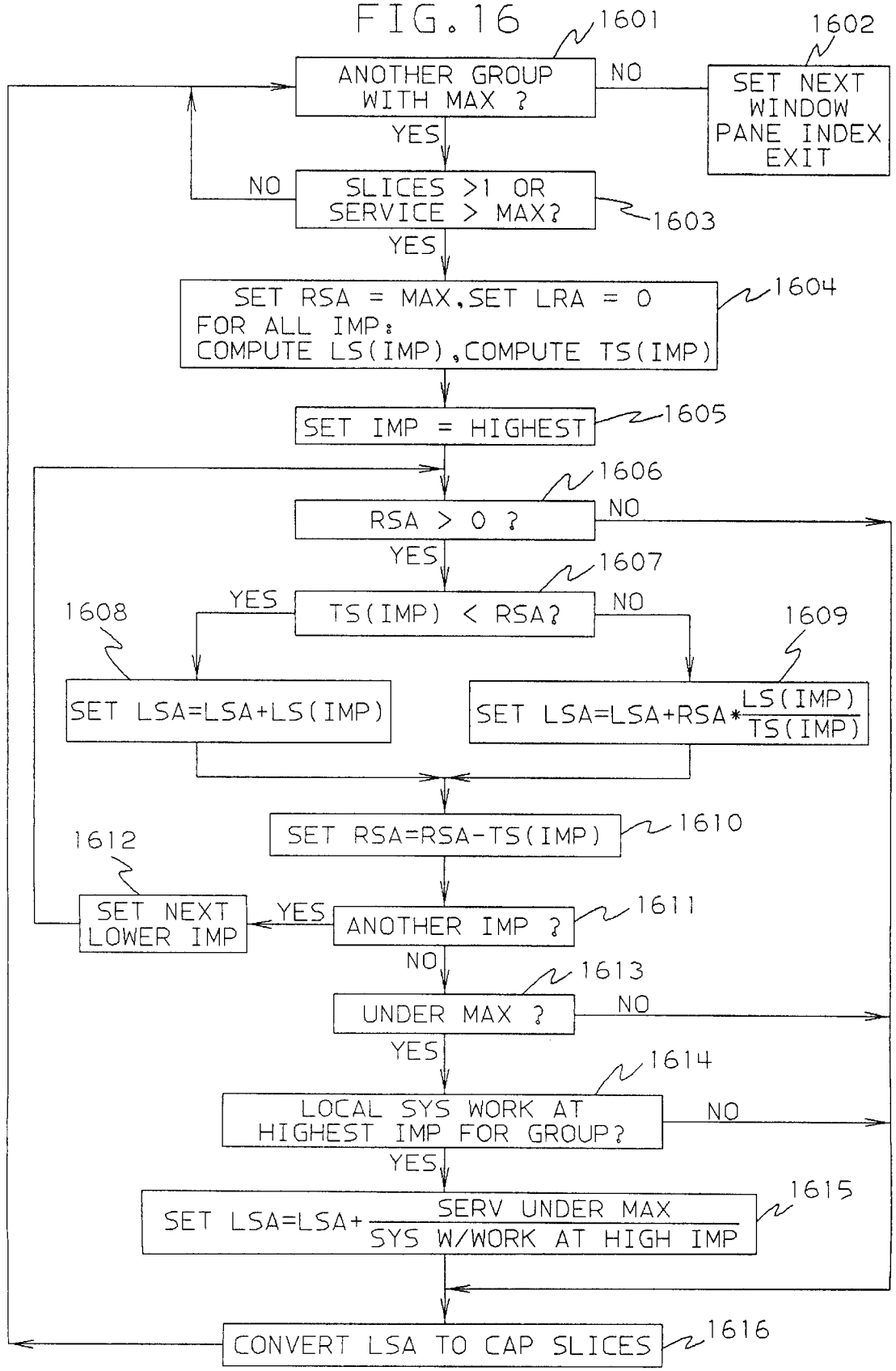

| PERFORMANCE GROUP NAME (1800) | | |
|---|---|---|
| IMP 0 | SERVICE CONSUMED ON SYSTEM AT IMP (1801) | SYSTEM HAS WORK AT IMP (1802) |
| 1 | | |
| 2 | | |
| 3 | | |
| 4 | | |
| 5 | | |
| 6 | | |

| 1 | < 0.500 * GOAL |
| 2 | < 0.575 * GOAL |
| 3 | < 0.650 * GOAL |
| 4 | < 0.725 * GOAL |
| ⋮ | |
| 21 | < 2.00 * GOAL |
| 22 | < 2.50 * GOAL |
| 23 | < 3.00 * GOAL |
| ⋮ | |
| 27 | < 5.00 * GOAL |
| 28 | > 5.00 * GOAL |

FIG. 23
DATA SENT FOR GOAL CLASSES
WITH A RESPONSE TIME GOAL:
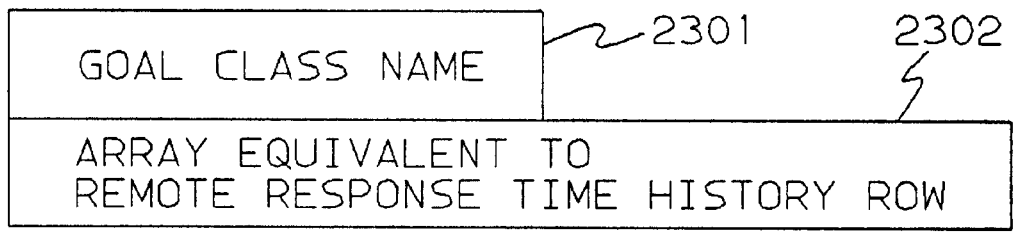
DATA SENT FOR GOAL CLASS
WITH A VELOCITY GOAL:
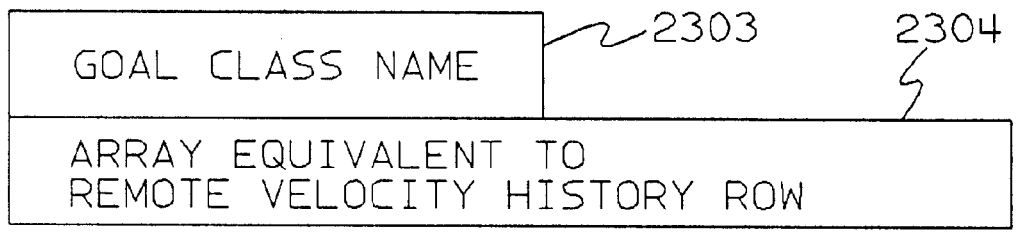

MULTI-SYSTEM RESOURCE CAPPING

This application is a continuation of application Ser. No. 08/383,042 filed Feb. 3, 1995, now abandoned.

This invention relates to managing the performance of user application program execution across a set of interconnected, cooperating, independent computer systems.

The user application programs do the useful work that is the purpose of the computer systems. These application programs form the units of work whose execution is managed by the computer's operating system software. These application programs are said to form a distributed workload in the sense that they are independent programs that are dispersed across the set of systems for execution, while sharing a common set of performance goals.

These computer systems are said to be independent in the sense that each is an entirely separate, wholly functional computer system whose resources are controlled by it's own copy of an operating system, such as IBM's Multiple Virtual Storage/Enterprise Systems Architecture (MVS/ESA)™ operating system. These computer systems are said to be cooperating in the sense that each is exchanging operational measurement data with the other computer systems in the set. These computer systems are said to be interconnected in the sense that each is able to transmit its operational measurement data to all the other systems in the set and to receive the analogous data from those other systems in the set. These computer systems comprise a set in the sense that they all have the characteristics cited above.

The present invention relates to managing performance in the sense that the operating system is adapted to establish a performance goal class for each distinct performance goal established for the set of systems; classifying each application program, in whichever system or systems of the set a given application program is to be executed, into its respective goal class as a part of scheduling the application program for execution; controlling the execution of the application programs so that the application programs that are assigned to a given goal class do meet the performance goal across all the systems, taken as a set.

BACKGROUND OF THE INVENTION

The invention disclosed in U.S. Pat. No. 5,473,443, "APPARATUS AND METHOD FOR MANAGING A DATA PROCESSING SYSTEM WORKLOAD ACCORDING TO TWO OR MORE DISTINCT PROCESSING GOAL TYPES" by J. D. Aman et al. (Aman), filed Apr. 4, 1994 and assigned to the assignee of the present invention and incorporated by reference, allows the specification of user performance standards and importance for standards and discloses how the operating system software can take over the responsibility for managing system performance according to the standards and importance, achieving the goals of the installation without requiring human intervention or specification of system performance parameters to guide such management. The Aman invention was; extended by the invention disclosed in U.S. Pat. No. 5,537,542, "APPARATUS AND METHOD FOR MANAGING SERVER WORKLOAD ACCORDING TO CLIENT PERFORMANCE GOALS IN A CLIENT/SERVER DATA PROCESSING SYSTEM" by C. Eilert and B. Pierce, filed Apr. 4, 1994 and assigned to the assignee of the present invention and incorporated by reference, to the client-server environment. The invention disclosed in the U.S. patent application Ser. No. 08/383,168, "APPARATUS AND METHOD FOR MANAGING A DISTRIBUTED DATA PROCESSING SYSTEM WORKLOAD ACCORDING TO A PLURALITY OF DISTINCT PROCESSING GOAL TYPES" by C. K. Eilert and P. Yocom (Eilert), filed on an even date herewith and assigned to the same assignee as the present invention is incorporated by reference. The Eilert invention extended Aman to the multi-system environment.

An unfulfilled requirement is to allow an installation to limit the processor resource consumed by workloads, to manage to workload performance standards within processor consumption standards, and to manage the performance standards and consumption standards across multiple systems.

SUMMARY OF THE INVENTION

The present invention allows the grouping of units of work into one or more resource groups and the specification of a consumption standard as a maximum amount of computer system processing capacity to be consumed by the units of work assigned to each resource group. The resource groups may have a multi-system scope. The computer operating system enforces the maximum specified. Limiting the processing capacity consumed by work units in individual computer systems is well known in the computer software art and is often called work-unit or program capping. Capping is usually accomplished by controlling the amount of time that a unit of work is available for dispatching by the dispatcher component of the operating system.

As in Aman and Eilert, the present invention also allows the specification of a performance standard comprising a goal for each of one or more user performance goal classes and the specification of the importance of achieving each goal. The present invention additionally allows the specification of a processor consumption standard comprising a grouping of user performance goal classes into processor resource consumption groups, each having a specified processor resource consumption maximum.

It is an object of the present invention that, given an awareness of the resource group maxima and the user performance goals and importance, the operating system takes on the responsibility for allocating computer system resources to executing work units such that those maxima, goals, and importance are best achieved.

Resource groups and user performance goal classes may span multiple interconnected, cooperating, independent computer systems over which the workload is distributed. Each local system collects workload performance and resource consumption data on the local system and periodically broadcasts a subset of the data to the remote systems. From the combination of the data collected on the local system and the data received from the remote systems, each system can independently determine the resource adjustments to make to meet the multi-system maxima, goals, and importance.

BRIEF DESCRIPTION OF THE DRAWINGS

The detailed description explains the preferred embodiments of the present invention, together with advantages and features, by way of example with reference to the following drawings.

FIG. 4 illustrates the state data used to select resource bottlenecks.

FIG. 5 is a flow chart showing logic flow for the find-bottleneck function.

FIG. 13 is a flow chart for calculating CPU time using sample deltas.

FIG. 14 shows more details of the system structure of FIG. 1.

FIG. 15 illustrates the data used to determine the amount of time units of work in resource groups should be capped.

FIG. 16 is a flow chart illustrating the steps used to determine the amount of time that units of work should be capped.

FIG. 23 shows the data sent to the remote systems for both response-time type performance goal classes and for execution-velocity type performance goal classes.

DETAILED DESCRIPTION OF THE INVENTION

Figure 1:
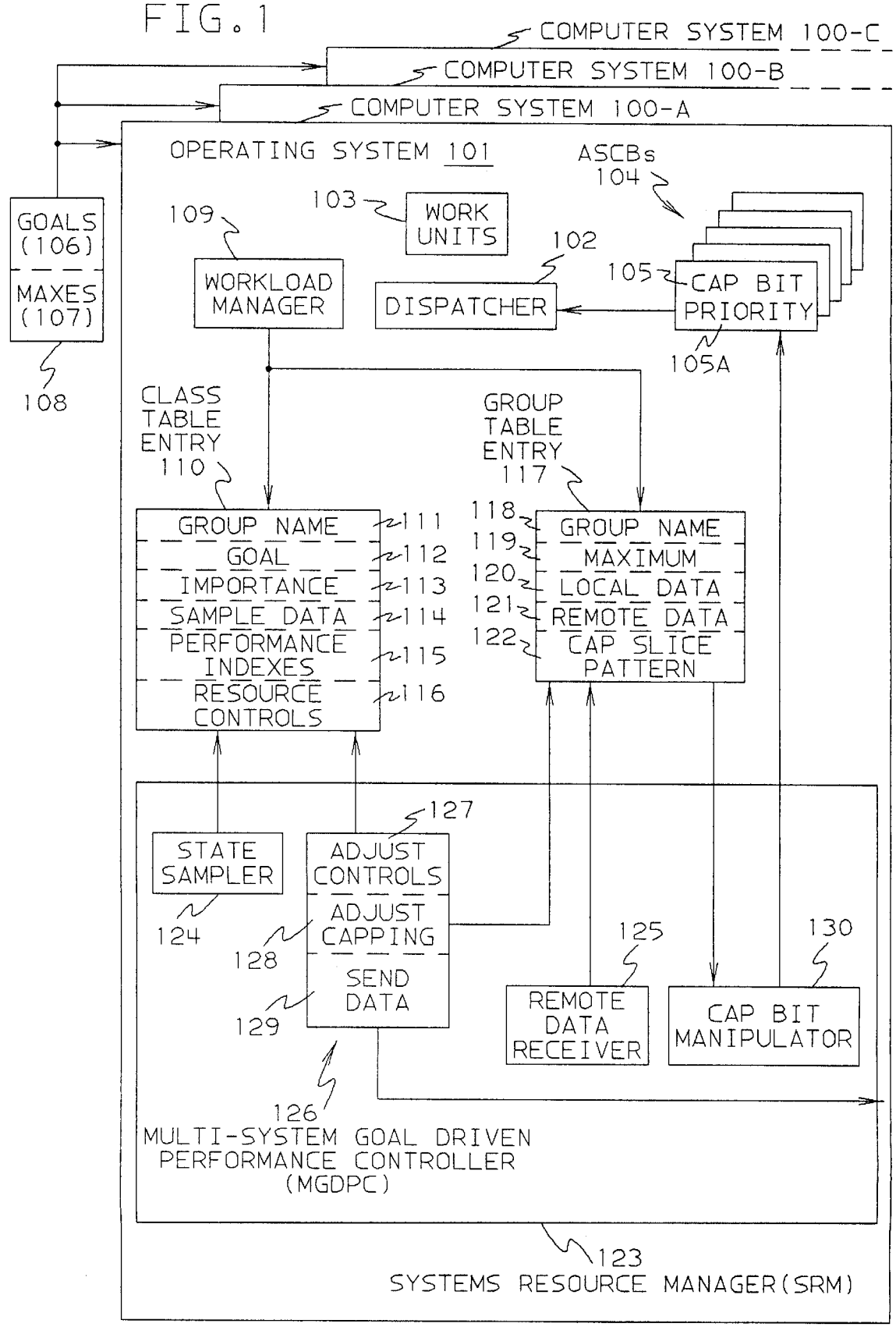
FIG. 1 is a system structure diagram of an exemplary embodiment having three interconnected, cooperating computer systems, showing local and remote computer systems with controlling operating systems and system resource manager components adapted as described for the present invention.

FIG. 1 illustrates the environment and the key features of the present invention for an exemplary embodiment having three interconnected, cooperating computer systems (100-A, 100-B, 100-C). The environment of this invention is that of a workload being distributed across a set of computer systems. This invention allows management of such a workload through a single policy for the set of systems. Having a single policy for the set of systems helps provide a single-image view of the distributed workload. Those skilled in the art will recognize that any number of such interconnected, cooperating computer systems may be used without departing from the spirit or scope of this invention.

The three computer systems (100-A, 100-B, 100-C) are executing a distributed workload, and each is controlled by its own copy of an operating system (101) such as IBM's MVS/ESA™ operating system. Each of these copies of the operating system executes the steps described in this specification. When the description below refers to a local system, it refers to a particular system that is executing the steps being described. The remote systems are all the other systems being managed. That is, the point of view of the description is that of any one particular system, considered to be the local system, and where all the other systems are considered to be remote systems.

A dispatcher (102) is a component of the operating system that selects the unit of work to be executed next by the computer. The units of work (103) are the application programs that do the useful work that is the purpose of the computer system. In the memory allocated to the operating system, each unit of work is represented by a control block called an address space control block (ASCB) (104). Each ASCB has a dispatch-control field (105) that indicates to the dispatcher whether the associated unit of work may be dispatched. This field is called the cap bit (105). This dispatch indicator is a system control data element or parameter that is set by the operation of the present invention and is used to control the amount of processor execution time allowed for a resource group of work units.

The present invention takes as input the performance goals (106) and processor consumption maxima (107) established by a system administrator and stored on a data storage facility (108). The goals and maxima apply to work across all the systems being managed (100-A, 100-B, 100-C). The data storage facility (108) is accessible by each system being managed.

The performance goal illustrated here is a response time goal (in seconds). Those skilled in the art will recognize that other goals, or additional goals, may be chosen without departing from the spirit or scope of this invention. Included with the performance goals is the specification of the relative importance of each goal. The goals (106) are read into each system (100-A, 100-B, 100-C) by a workload manager (WLM) component (109) of the operating system. Each of the goals specified by the system administrator causes the workload manager to establish a user performance goal class to which individual work units are assigned. Each user performance goal class is represented in the memory allocated to the operating system by a class table entry (110). Information stored in a class table entry includes the resource group name to which the user performance goal class belongs (111) (an input value), the user performance goal (112) (an input value), the relative importance of the user performance goal class (113) (an input value), sample data (114) (measured data), the local and multi-system performance indexes (115) (computed values), and system resource controls (116), such as the dispatching priority of the work units, set by the operation of the present invention.

The processor consumption maximum (107) illustrated here is expressed in processor service units. Those skilled in the art will recognize that other units of measure of processor consumption may be chosen without departing from the spirit or scope of this invention. The processor consumption maxima (107) are read into each system by the workload manager (WLM) component (109) of the operating system. Each of the resource consumption maxima (107) specified by the system administrator causes the workload manager to establish a resource group to which individual work units are assigned. Each resource group is represented in the memory allocated to the operating system by a resource group table entry (117). Information stored in a resource group table entry includes the resource group name (118) (an input value), the processor service consumption maximum (119) (an input value), processor service consumption data from the local and remote systems (120 and 121) (measured data), and the specific time slices when the work units in the resource group should be capped (cap slice pattern, 122), that is, the specific time slices when the cap bit should indicate that the work units associated with the resource group are not dispatchable. Cap slice pattern (122) is a computed value.

A system resource manager (SRM) component (123) of the operating system is modified according to the present invention to include a component that manipulates the cap bit (105) value that is interrogated by the dispatcher (102). This new component of the system resource manager is called the cap bit manipulator (130), described later. The state sampler (124), remote data receiver (125), and multi-system goal driven performance controller (MGDPC) (126) (as disclosed in Eilert) of the system resource manager (123), are also modified according to the present invention and are described below.

STATE SAMPLER

State sampling is well known in the art. The state sampler (124) is modified to sample the additional state when the dispatcher does not dispatch a unit because the cap bit (105) has been turned on by the cap bit manipulator (130). These cap samples are combined with processor delay samples when used by the MGDPC (126) in computations.

MULTI-SYSTEM GOAL DRIVEN PERFORMANCE CONTROLLER

The multi-system goal driven performance controller (MGDPC) (126) of the system resource manager (123) is described in Eilert. MGDPC (126) is the component of the system resource manager that calculates performance indexes and adjusts system resource controls such as dispatching priority to manage the achievement of user performance goals across the set of interconnected, cooperating, independent computer systems being managed. MGDPC (126) provides a feedback loop for the incremental detection and correction of performance problems so as to make the operating system (101) adaptive and self-tuning. MGDPC (126) is invoked via timer expiration.

MGDPC operation is shown in more detail in FIG. 14. The MGDPC performs the functions of measuring the achievement of goals, selecting the user performance goal classes that need their performance improved, and improving the performance of the user performance goal classes selected by modifying the system control parameters (the controlled variables) of the associated work units, as described later. The MGDPC function is performed periodically based on a periodic timer expiration approximately every ten seconds in the preferred embodiment.

At (1415), a multi-system performance index and a local performance index are calculated for each user performance goal class (110) using the specified goal (1410 or 1411). The multi-system performance index (1451) represents the performance of work units associated with the goal class, across all the systems being managed. The local performance index (1452) represents the performance of work units associated with the goal class on the local system. The resulting performance indexes are recorded in the corresponding class table entry (110) at (1451) and (1452). The concept of a performance index as a method of measuring user v performance goal achievement is well known. For example, in U.S. patent application Ser. No. 07/876,670, "WORKLOAD MANAGER FOR ACHIEVING TRANSACTION CLASS RESPONSE TIME GOALS IN A MULTIPROCESSING SYSTEM", by D. Ferguson, et al., filed Apr. 30, 1992 and assigned to the assignee of the present invention, the performance index is described as the actual response time divided by the goal response time. This application is incorporated Icy reference.

At (1416), a user performance goal class is selected to receive a performance improvement in the order of the relative goal importance (113) and the current value of the performance indexes (1451, 1452). The selected user performance goal class is referred to as the receiver. The MGDPC first uses the multi-system performance index (1451) when choosing a receiver so that the action it takes has the largest possible impact on causing work units to meet goals across all the systems being managed. When there is no action to take based on the multi-system performance index, the local performance index (1452) is used to select a receiver that will most help the local system meet its goals.

The performance bottleneck, relative to the system control data elements, is determined (1417) by using state samples (114), a well known technique. The system control data element is dispatch priority (104) (affects CPU delay and cap delay). Those skilled in the art will recognize that other controlled variables may be chosen without departing from the spirit or scope of this invention.

At (1418), the potential changes to the controlled variables are considered. A user performance goal class is selected (1423) for which a performance decrease can be made based on the relative goal importance (113) and the current value of the performance indexes (1451, 1452). The user performance goal class thus selected is referred to as the donor. Next, the proposed chancres are assessed (1424) for net value relative to the expected changes to the multi-system and local performance indexes for both the receiver and the donor for the controlled variable (dispatch priority (1420) (105A). A proposed change has net value if the result would yield more improvement for the receiver than harm to the donor relative to the goals. If the proposed change has net value, then the respective controlled variable is adjusted for both the donor and the receiver.

During each invocation of the MGDPC, all combinations of receiver goal classes, performance bottlenecks, donor goal classes, and actions are considered. Contemplated changes in the controlled variables must yield sufficient receiver value and contemplated reallocation of resources between receiver(s) and donor(s) must have net value for the contemplated changes to be made in fact. These steps are described in more detail in later sections.

Each system to be managed has a send-data means (129) that allows each system to send data records to every other system. A data record describing the recent performance of each goal class (FIG. 23) is sent (214) to every other system.

At (125) a remote data receiver receives performance data from remote systems asynchronously with respect to the operation of the MGDPC. The received data is placed in a remote performance data history (1457, 1458) and in the remote data windows (121) for later processing by the MGDPC.

PRIMARY PROCESSING STEPS

Figure 2:
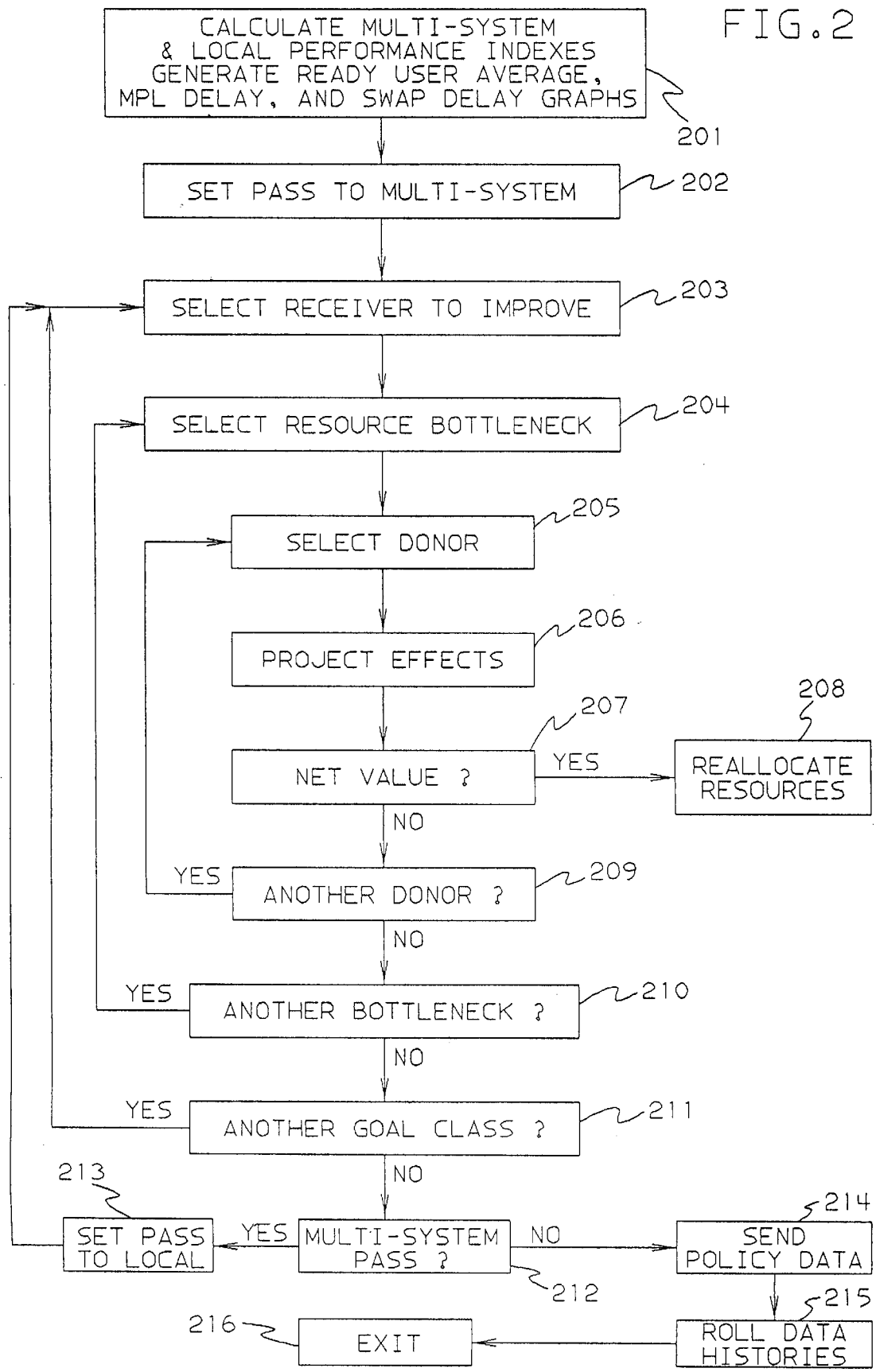
FIG. 2 is a flow chart showing the overall logic flow in the goal-driven performance-controller component.

FIG. 2 is a flow chart showing the logic flow for the primary processing steps of the multi-system goal driven performance controller (MGDPC) of the present invention (126).

The primary objective of the MGDPC is to meet performance goals across all the systems being managed. This objective is met without any centralized control. Instead, each system receives performance data from all the other systems being managed and, based on its view of how the entire distributed workload is doing, makes resource allocation decisions to best meet goals. A secondary objective of the MGDPC is to meet performance goals locally, in which case resource allocation decisions are made using local and remote data.

At (201), a multi-system and a local performance index are calculated for each user performance goal class. (The performance index calculation is described later.) Up to two passes may be made through steps (203)–(213). The first pass is called the multi-system pass. During the multi-system pass, receivers and donors are chosen based on how a goal class is performing across all the systems being managed. During the second pass, called the local pass, receivers and donors are chosen based on both how a goal class is performing locally in addition to how it is performing across all the systems being managed. The local pass is performed only when no action is taken during the multi-system pass. At (202), a loop control variable is set to indicate that the multi-system pass is currently being processed. At (203), a user performance goal class, referred to as the receiver, is selected to have its performance improved. The selection process is shown in more detail in FIG. 3, described later. At (204), one of the receiver's resource bottlenecks is selected as the bottleneck to be addressed. Bottleneck selection is shown in more detail in FIG. 5, described later. At (205), user performance goal classes that own the resource identified as required to improve the performance of the receiver are selected. These selected user performance goal classes are referred to as donors. Donors are selected in reverse order to receivers, that is, the user goal classes having the best performance indexes and least importance are selected. Donor selection is shown in more detail in FIG. 6, described later.

At (206), the effects of the resource reallocation from the donor to the receiver are projected. The algorithms used to project the effects of resource reallocation depend on the resource involved. The CPU algorithm to address CPU and cap delay is described later in this specification. At (207), the net value of reallocating the resource from the donor or donors to the receiver is assessed. A receiver will only be improved by reallocating resource from a specific donor if there is projected to be net positive value to the resource reallocation. If using a donor to improve a receiver is projected to result in more harm to the donor than improvement to the receiver relative to the goals and importance, the resource reallocation is not done. Net value assessment is shown in more detail in FIG. 8, described later.

If there is net positive value to the reallocation, the resources are reallocated from the donor or donors to the receiver at (208). If there is not net positive value, a check is made at (209) to determine whether there is another potential donor.

If there is another potential donor, control passes to (205) to select another potential donor. If there are no more potential donors of the resource required to address the selected bottleneck, a check is made at (210) to determine whether the receiver has another bottleneck.

If the receiver has another bottleneck that can be addressed, control returns to (204) to select another bottleneck. If the receiver has no more bottlenecks to address, a check is made at (211) to determine whether there is another potential receiver.

If there is another potential receiver, control returns to (203) to select another potential receiver. If there are no more potential receivers, a check is made at (212) to see if the loop control variable indicates that the current pass is the multi-system pass. If the current pass is the multi-system pass, at (213) the loop control variable is set to indicate that the current pass is the local pass and control returns to (203) to select another potential receiver.

If the local pass has already been taken, control passes to (214) to send performance data to each of the remote systems that is being managed. At (215) data histories are rolled (see description of data histories later in the next section).

The MGDPC function is invoked again when the timer next expires, providing feedback on the effect of the resource reallocations made previously and again providing the opportunity to address performance problems.

DATA HISTORIES

Figures 19, 20:
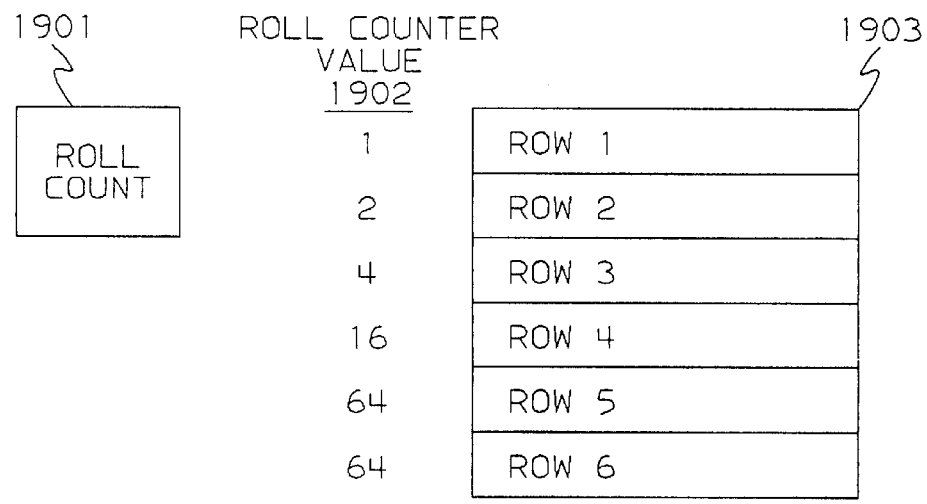
FIG. 19 shows the parts of a data history
FIG. 20 diagrams a row of the remote response time data history.

A data history is a mechanism to collect and analyze data over time. By using data histories the MGDPC can use data that has enough samples to be representative without using data that is so old that it might be out of date. FIG. 19 shows an exemplary data history. A data history contains 6 rows of data (1903) and a roll counter (1901). Each row represents data from a range of time in history. Row 1 contains data from the most recent period only. Rows 2–6 contain varying ranges of older data. The roll counter controls when to roll a row of data from one time range to a time range further back in time. The roll counter is incremented each MGDPC interval. Each row has associated with it a number (1902) that corresponds to the roll counter value specifying when the data in the row should be 'rolled'. Row 1's row counter value is 1, which means row 1 is rolled every interval. Row 2's interval number is 2; row 2 is rolled every second interval. Row 3's roll counter value is 4, row 3's roll counter value is 16, row 5's roll counter value is 64, and row 6's roll counter value is 64.

Data is added to the history as follows. New data is added to row 1. At the end of each MGDPC interval the highest row whose roll counter value evenly divides into the current roll counter value is found. The contents of that row is added to the next numerically higher row. The contents of all the numerically lower rows are moved up one row, leaving row 1 empty. When it is time to roll data out of row six, the data is discarded. To get data from a data history, the data from rows 1 through n are added together. The value of n is chosen such that the data used was gathered over a long enough interval with enough samples to be representative. See the description for choosing the number of rows in the section PERFORMANCE INDEX later in this specification.

Each goal class with a response time goal has a local and remote response time data history (1457) which contains the performance data received from remote systems for the goal class. Each row in this history is an array with 28 entries. FIG. 20 shows layout of the array. Each entry in this array contains the number of completions that had a response time within a certain percentage of the goal. The first entry contains the count of completions that had a response time of less than half the goal. The second entry contains the count of completions that had a response time of more than half the goal but less than 0.575 times the goals.

Each goal class with velocity goals has a local and remote velocity sample data history (158). Each row of this history is an array with two entries. The first entry contains a count of the number of times work in the goal class was sampled as running. The second entry is a count of the number of times work in the goal class sampled as running or delayed (non-idle).

PERFORMANCE INDEX

A performance index of 1.0 indicates the user performance goal class is exactly meeting its goal. A performance index greater than one indicates the class is performing worse than its goal, and a performance index less than 1.0 indicates the class is performing better than its goal. A multi-system performance index indicates how the user performance goal classes are performing across all the systems being managed. The local performance index indicates how the user performance goal classes are performing on the local system.

EXECUTION VELOCITY PERFORMANCE INDEX

The performance index is calculated (1415) for execution velocity goals (1411) as follows:

(execution velocity goal)/(actual execution velocity)

Execution velocity is the time work in the user goal performance class is running, divided by the time work is running or delayed, expressed as a percentage. The performance index is the goal divided by the actual execution velocity for work with execution velocity goals and actual response time divided by the response time goal for work with response time goals.

For execution velocity goals, the local execution velocity is calculated from the local samples history (125). Each row of the local samples history (125) is an array where the first entry is a count of the number of times work units in the goal class have been sampled running, and the other entries are counts of the number of times work units in the goal class were sampled delayed for each of the eight delay-states addressed by the present invention. The delay states sampled are: CPU delay, MPL delay, swap delay, private area auxiliary storage paging delay, common area auxiliary storage paging delay, cross memory paging delay, virtual input/out (VIO) auxiliary storage delay, and hiperspace™ auxiliary storage paging delay. The techniques for sampling these delays are well known in the art.

When taking data from the local samples histories (125), enough rows are added together to include at least 500 non-idle samples. The first two rows of the history are always used. When adding the histories rows together, the first row is doubled to more heavily weight the most recent data. To calculate the current velocity the CPU using samples from the combined row are divided by the total samples in the combined row. This local velocity is divided into the class's goal to calculated the local performance index.

RESPONSE TIME PERFORMANCE INDEX

The performance index is calculated (1415) for response time goals (1410) as follows:

(actual response time)/(response time goal)

For response time goals, the local performance index is calculated from data from the local response time history (1426). FIG. 20 shows a row of the local response time history (1426). For goal classes having response goals of less than or equal to 20 seconds, enough rows of the local response time data history are added together to comprise at least a 100 completions. For goal classes having longer response time goals, enough rows are added together to comprise at least 10 completions. At least the first two rows of the history are always used. When adding the rows together, the values in the first row are doubled to more heavily weight recent information. Next a response time is projected for each in-flight work unit as follows:

1. Find the average amount of service used by work units assigned to the same goal class that completed with more service time than the work unit in question has used so far.

2. Subtract the amount of service time the work unit has used so far from this average to get a projection for the amount of additional service time the work unit will use.

3. Divide the projection for addition service time by the rate the work unit is accumulating service time to get a projection for the time until the work unit completes.

4. Add the projection for the time until the work unit completes to the length of time the work unit has already run to get the projection for the work units response time.

Each projected completion for in-flight work units is added to the appropriate entry in the row built from the local response time history. From this combined row a local average response time is calculated and this average response time is divided by the goal to calculate the local performance index.

MULTI-SYSTEM PERFORMANCE INDEX

Figure 22:
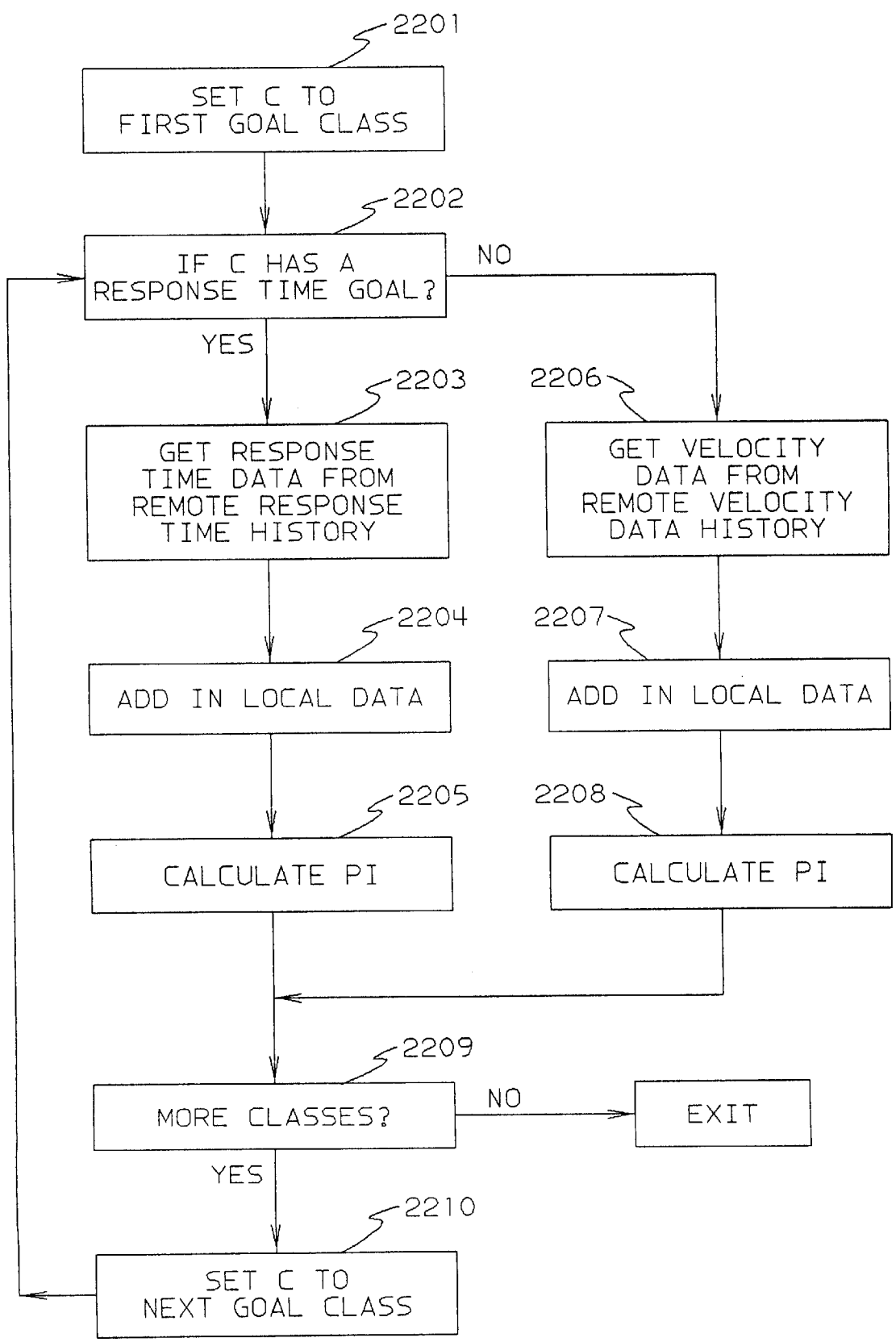
FIG. 22 is a flow chart of the steps taken to calculate the multi-system performance index.

The following steps are taken to calculate the multi-system performance index for each goal class and illustrated in FIG. 22. At (2201) the variable C is set to the first goal class. At (2202) C is tested to determine whether the goal class has a response time goal. If C has a response time goal, control passes to (2203) where data is taken from the remote response time data history. When taking this data from the remote response time data history, enough rows of the history are used to represent the same amount of time as the data used to calculate the local performance index. The response time data returned from the remote response time data history is in the form of one row of the history (see FIG. 19). To get data representing all the systems being managed, the local response time data used to calculate the local performance index is added to remote data at (2204). From the combined response time data an average response time is calculated, and this average is used to calculate the multi-system performance index at (2205).

If the goal class specified by C has an execution velocity goal, control passes to (2206) where data is taken from the remote velocity history. When taking this data from the remote velocity history, the same number of rows are used as were taken from the local samples history when calculating the local performance index. The local execution velocity data is added to this remote data at (2207) by adding to the first entry of the combined row the local cpu using samples used to calculate the local velocity and adding to the second entry of the combined row the sum of the delay state counts used to calculate the local velocity. From this multi-system execution velocity data a multi-system velocity is calculated; and from the multi-system velocity, the multi-system performance index is calculated at (2208).

If there are more goal classes to process (2209), control passes to (2211) where C is set to the next goal class. Then control returns to (2202) to process the next goal class.

SEND PERFORMANCE DATA

Figures 17, 18:
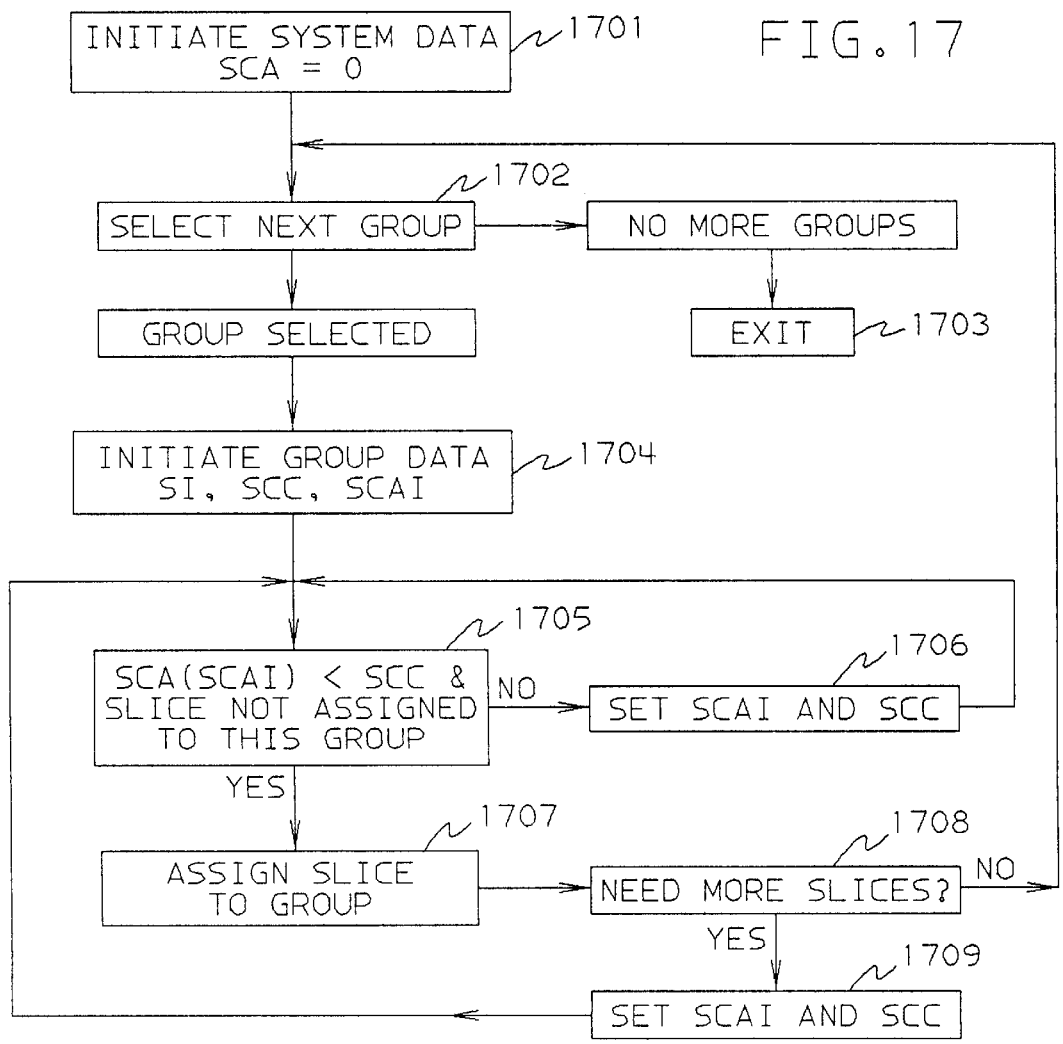
FIG. 17 is a flow chart illustrating how to assign specific slices in the cap slice pattern.
FIG. 18 illustrates the data that is received by the remote data receiver means.

At the end of the multi-system goal driven performance controller interval a data record describing the performance of each goal class during the interval is sent to each remote system being managed. The processor resource consumption data for each of the resource groups is sent to each remote system at the same time as the sending of the performance data; the processor resource consumption data, illustrated in FIG. 18, is described later. FIG. 23 shows the performance data that is sent to each remote system. For a performance goal class having response time goals, this data record contains the goal class name (2301) and an array having 28 entries (2302), equivalent to a row of the remote response time data history that describes the completions in the goal class over the last MGDPC interval. For a goal class having velocity goals, this data record contains the goal class name (2303), the count of times work in the goal class was sampled running in the last MGDPC interval, and the count of times work in the goal class was sampled as running or delayed in the last MGDPC interval (2304).

REMOTE DATA RECEIVER

Figure 21:
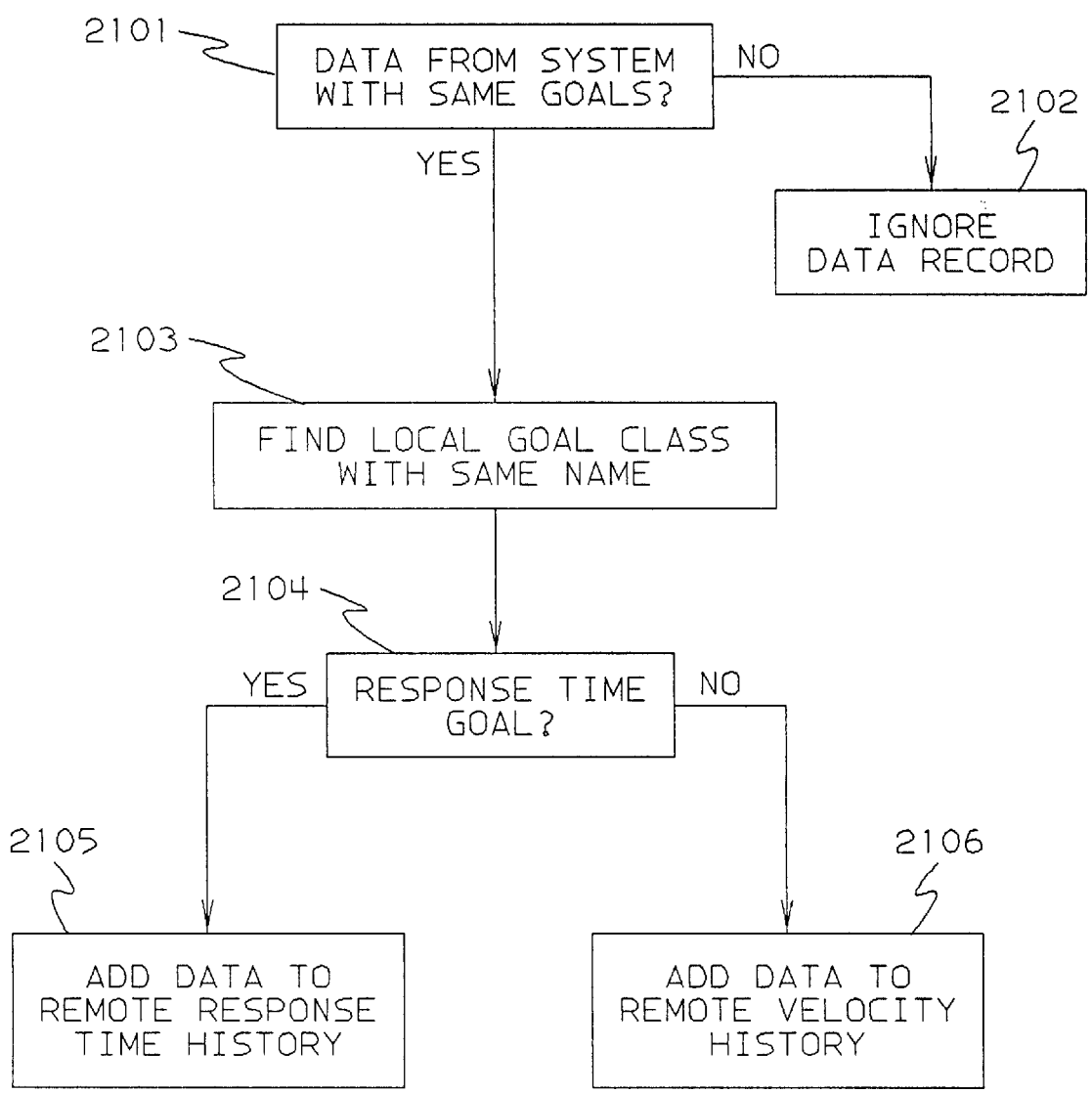
FIG. 21 is a flow chart of the steps taken by the remote data receiver.

FIG. 21 shows a flow chart of the logic flow for receiving remote goal class performance data. At (2101) the incoming data record is checked to verify that is coming from a system running with exactly the same set of goal classes and performance goals. If this check fails, the data record is ignored (2102). At (2103) the performance goal class table is searched to find the goal class with the same name as the goal class represented by the incoming data record. If the goal class found by this search has a response time goal (2104), the response time data in the incoming data record is added to the goal class's remote response time data history; otherwise, the velocity data in the incoming record is added to the goal class's remote velocity data history.

The use of data histories to manage the remote performance data allows the systems being managed to operate independently. If data from a remote system does not arrive for one MGDPC interval, the data history mechanism will compensate if necessary by using older data to ensure that data with enough samples to be representative is used. Also if one of the remote system being managed goes down, its data will gracefully age out of the data history without the other system having to be specifically notified that a system went down.

The remote data receiver means (125) is disclosed in Eilert. The remote data receiver means is the component of the system resource manager (123) that runs on each system, receives the data broadcast from the remote systems (FIG. 23), and stores the data in control blocks for use on the local system. In the present invention the remote data receiver is modified to additionally receive resource group processor consumption data broadcast by the remote systems and to store that data (FIG. 18) in the current window pane (1505) in the resource group table entries (FIG. 15). The data record received consists of the resource group name (1800), the processor consumption at each importance (1801), and an indicator of whether the system has work at each importance (1802). The appropriate resource group table entry is determined from the resource group name (1800) associated with the received data. The current window pane index (1503) specifies which element of the window arrays (1505) is to be used to store the arriving data. The remote processor resource consumption data is used by the adjust capping means (128) of the MGDPC (126).

The use of data windows to manage the remote performance data allows the systems being managed to operate independently. If data from a remote system does not arrive for one MGDPC interval, the data window mechanism will compensate if necessary by using older data to ensure that data with enough samples to be representative is used. Also if one of the remote system being managed goes down, its data will gracefully age out of the data window without the other system having to be specifically notified that a system went down.

SELECT RECEIVER TO IMPROVE

Figure 3:
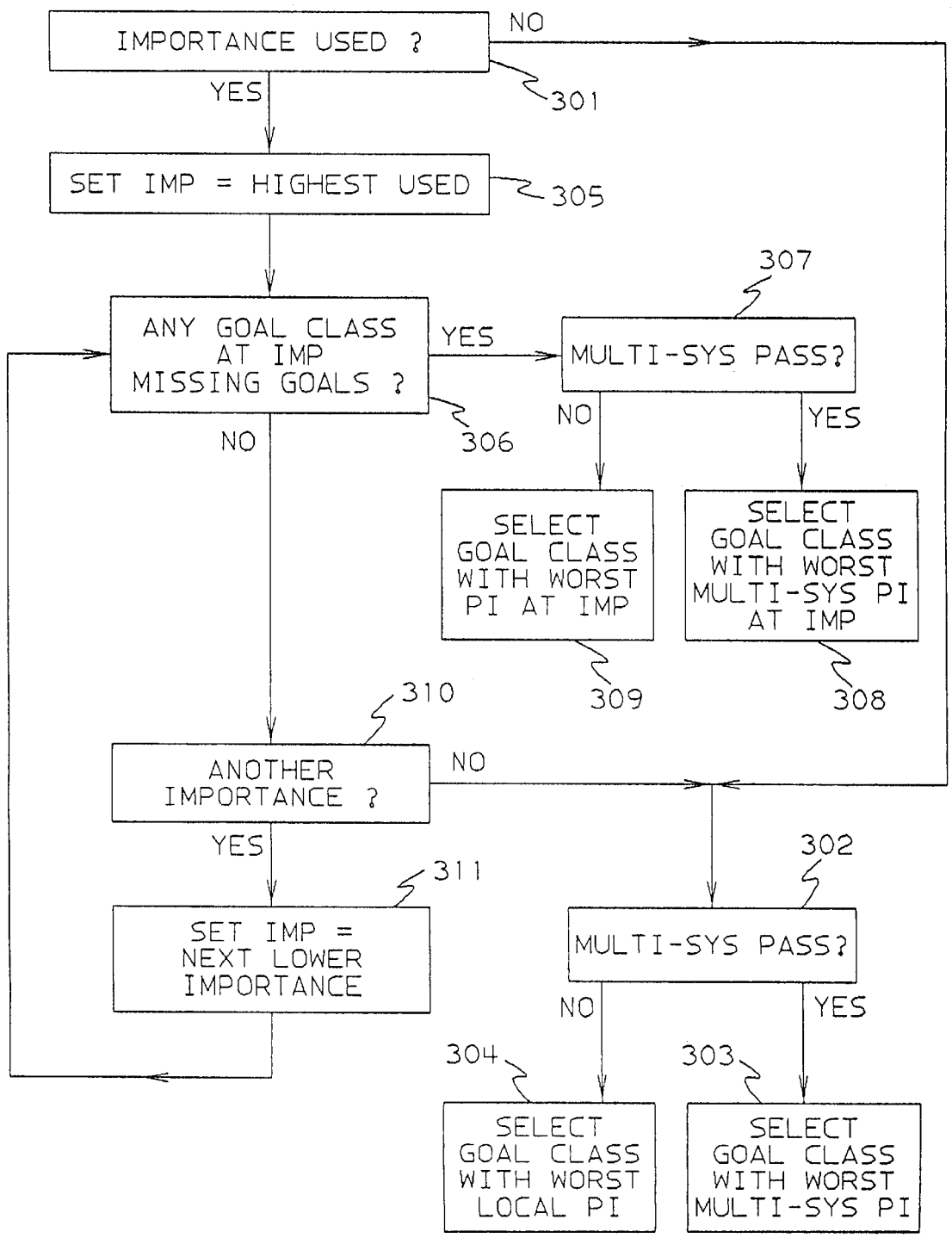
FIG. 3 is a flow chart showing logic flow for the select-receiver function.

FIG. 3 shows a flow chart of the logic flow used by the select receiver means (1416) for selecting a performance goal class to receive a performance improvement. At (301) the performance goal class table is searched to determine whether any entries have an associated importance value. Importance values are optional when specifying the performance goals. If no importance values have been specified for any of the goal classes, at (302) the MGDPC pass is tested to determine whether the current pass is the multi-system pass or the local pass. If the current pass is the multi-system pass, the goal class having the worst (highest) multi-system performance index is selected (303). If the current pass is the local pass, the goal class having the worst local performance index is selected (304).

If importance values have been specified, the importance value to be considered is initialized to the highest importance value specified for any performance goal class (305). At (306) the set of goal classes with the importance being considered is checked to determine whether any of these goal classes is missing its goal. The definition of goal-missing depends on the MGDPC pass being performed. If the MGDPC pass is the multi-system pass, a goal class is considered to be missing its goal if its multi-system performance index is greater than 1. If the MGDPC pass is the local pass, a goal class is considered to be missing its goal if either its multi-system or local performance index is greater than 1. If there is a goal class at the importance being considered that is missing its goal, a goal class is chosen based on the MGDPC pass (307). That is, if the pass is the multi-system pass, the goal class with the worst multi-system performance index is chosen (308); if the pass is the local pass, the goal class with the worst local performance index is chosen (309).

If no goal class is missing its goal at the importance being considered, and if another lower importance value has been specified (310), the next lower importance value specified is set to be considered (311) and control returns to (306). If no goal class at any importance is missing its goal, control passes to (302) to chose the goal class with the worst performance index based on MGDPC pass.

FIND BOTTLENECK

FIG. 4 illustrates the state data used to select resource bottlenecks (1417) to address. For each delay type, the performance goal class table entry contains the number of samples encountering that delay type and a flag indicating whether the delay type has already been selected as a bottleneck during the present invocation of the multi-system goal driven performance controller.

The logic flow of the find bottleneck means is illustrated in FIG. 5. The selection of a bottleneck to address is made by selecting the delay type having the largest number of samples that has not already been selected during the present invocation of the multi-system goal driven performance controller. When a delay type is selected, the flag is set so that delay type is skipped if the find bottleneck means is reinvoked during this invocation of the multi-system goal driven performance controller.

The find bottleneck means of the adjust controls means (127) of MGDPC (126) has been modified to add the new cap delay samples to the processor delay samples (501) and use the sum of the cap and processor delay samples to determine whether processor access is the next largest bottleneck to address. This modification produces the new result of an MGDPC that can adjust for both processor delay and cap delay by increasing dispatching priority.

In FIG. 5 at (501), a check is made to determine whether the sum of the CPU delay type samples plus the cap delay type samples has the largest number of delay samples of all the delay types that have not yet been selected. If yes, at (502), the CPU-delay-selected flag is set and CPU delay is returned as the next bottleneck to be addressed. At (503) a check is made to determine whether another delay type, say the type X delay type, has the largest number of delay samples of all the delay types that have not yet been selected. If yes, at (504), the type X-delay-selected flag is set and the type X delay is returned as the next bottleneck to be addressed. At (505) a check is made to determine whether a third delay type, say the type Y delay type, has the largest number of delay samples of all the delay types that have not yet been selected. If yes, at (506), the type Y-delay-selected flag is set and type Y delay is returned as the next bottleneck to be addressed. Those skilled in the art will recognize that any number of different delay types that have been sampled can be used to find bottlenecks in the same manner as described above.

FIXING DELAY

This section describes in particular how the receiver performance goal class performance is improved by changing a controlled variable or parameter to reduce the delay selected by the find bottleneck means.

GENERAL FIX FLOW

Figure 7:
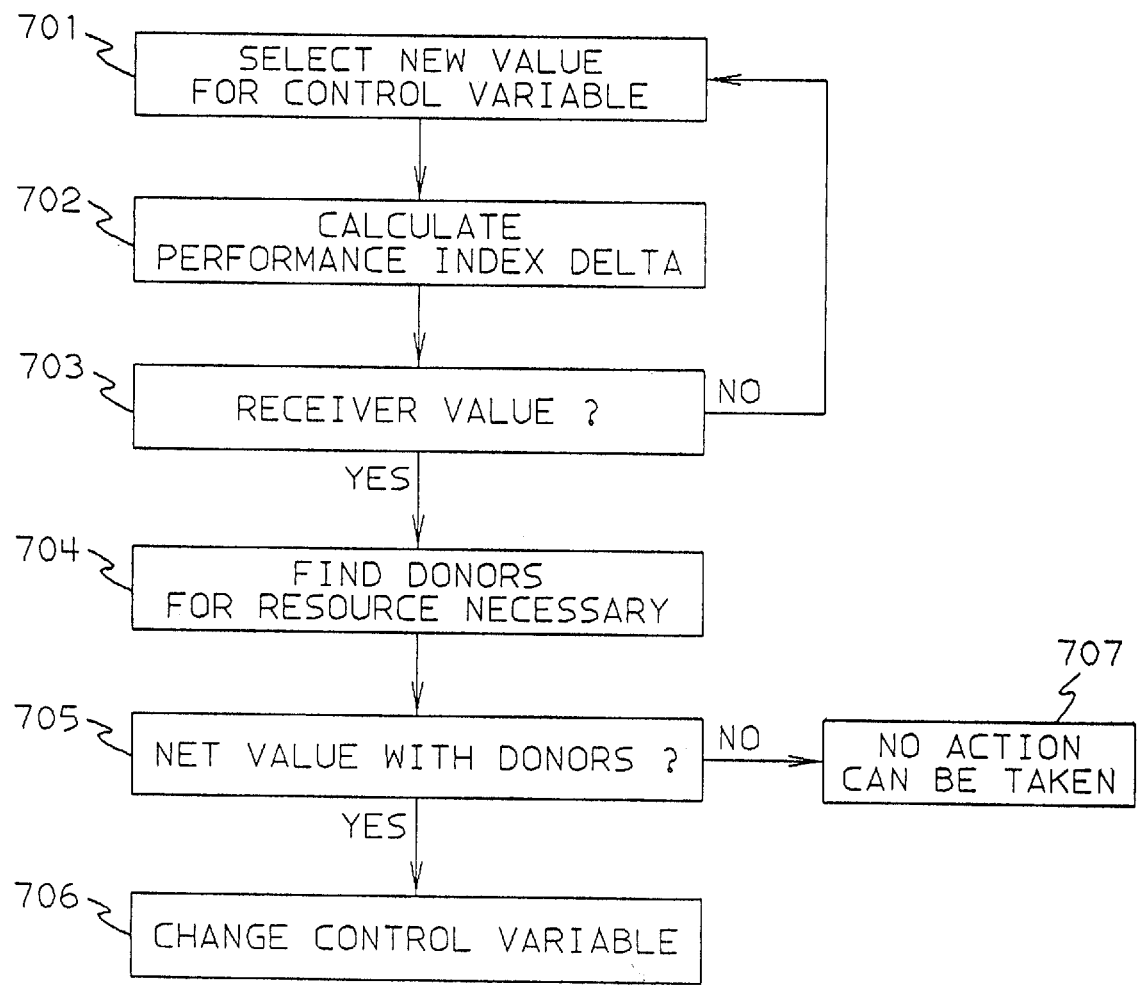
FIG. 7 is a flow chart showing logic flow for the fix means.

FIG. 7 illustrates the steps required by the Fix means (1418) to assess improving a receiver goal class performance by changing the controlled variable related to the chosen resource bottleneck. At (701), a new value is chosen for the controlled variable. At (702), the change to the multi-system and local performance indexes is calculated for the receiver performance goal class. The details of this calculation are specific to individual resources and are described below. At (703), the improvement in the performance index is checked to determine whether the change results in sufficient value to the receiver. If there is not sufficient receiver value, control returns to (701) where a value is chosen for the controlled variable that will result in greater benefit for the receiver.

When there is sufficient receiver value, control passes to (704) where the select donor means (1423) is called to find donors of the resource needed to make the control variable change. At (705), a check is made to see whether the proposed change has net value. For the change to have net value the benefit to the receiver in relation to goals and importance must be more than the harm to the donors. If the proposed change does have net value, the controlled variable is changed at (706). If there is not net value, the chosen resource bottleneck cannot be fixed (707).

SELECT DONOR

Figure 6:
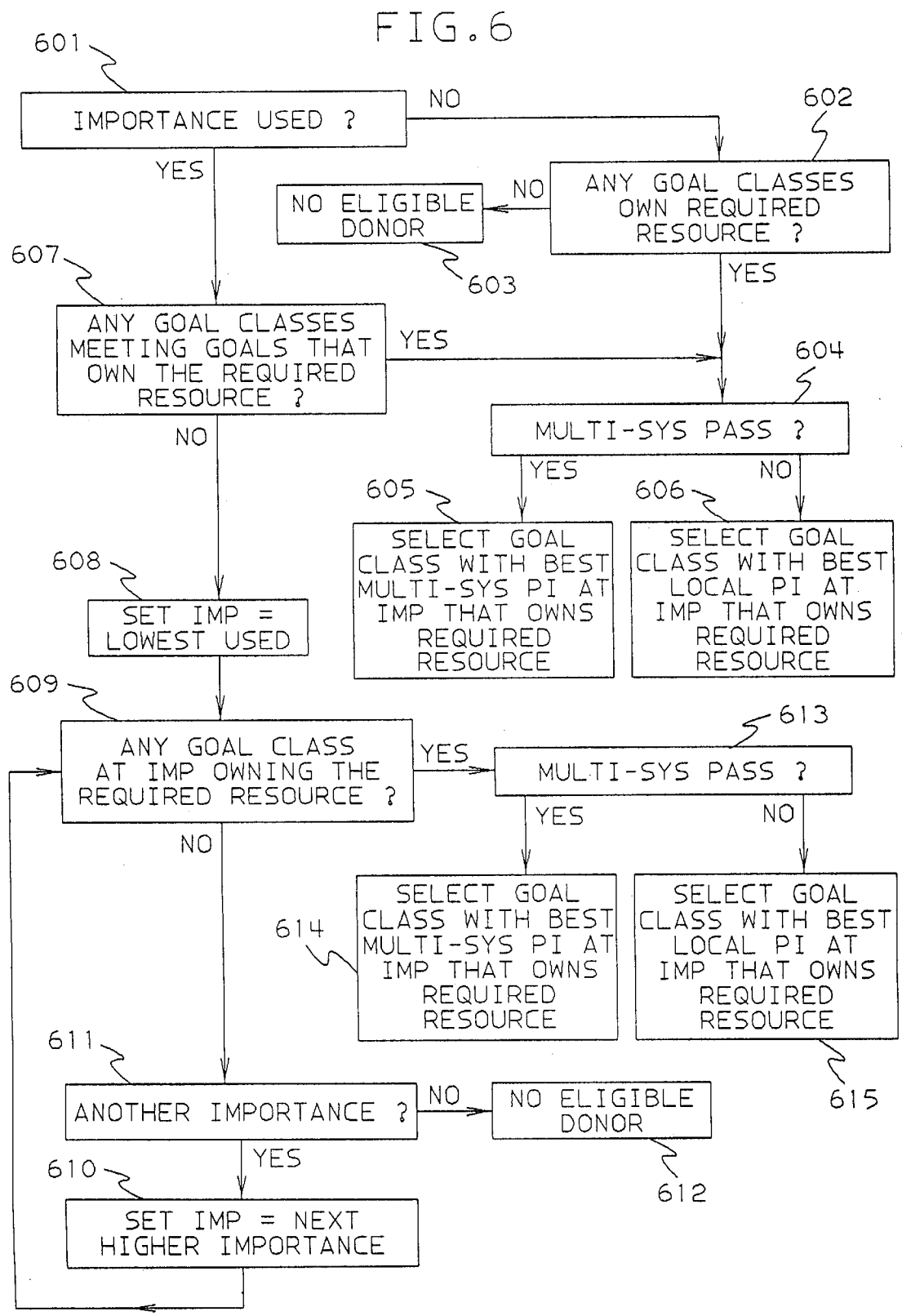
FIG. 6 is a flow chart showing logic flow for the select-donor function.

FIG. 6 is a flow chart showing logic flow for the select-donor means (1423). The purpose of the select-donor means is to choose from the set of goal classes that own the required resource the most eligible goal class to donate that resource to the receiver. At (601) the performance goal class table is searched to determine whether any entries have an associated importance value. If no goal class has an importance value associated with it, the select donor means determines whether any goal class owns the required resource (602). If no goal class owns the required resource, there is no eligible donor (603). If there are such goal classes, the select donor means chooses as the donor the goal class having the best performance index based on the MGDPC pass (604–607). If the current pass is the multi-system pass, the multi-system performance index is used; otherwise, the local performance index is used.

If there are goal classes with importance specified, the select donor means determines whether there are any goal classes owning the require resource that are meeting goals (607). As with the select receiver means, if the MGDPC pass is multi-system, a goal class is considered to be meeting its goal if its multi-system performance index is less than or equal to 1. If the current pass is the local pass, a goal class is considered to be meeting its goal if both its multi-system and its local performance indexes are less than or equal to 1. If there are goal classes meeting goals that own the required resource, control passes to (604) to chose the goal class with the best performance index based on MGDPC pass. Importance is not used to differentiate among goal classes meeting their specified goals.

If there is no goal class that is both meeting its specified goal and that owns the required resource, the select donor means finds the goal classes that have the lowest specified importance value and that own the required resource (608–611). If there are such goal classes, select the donor chooses the goal class having the best performance index based on MGDPC pass (613–615). If no goal class owns the required resource, there is no eligible donor in the system (612).

ASSESS NET VALUE

Figure 8:
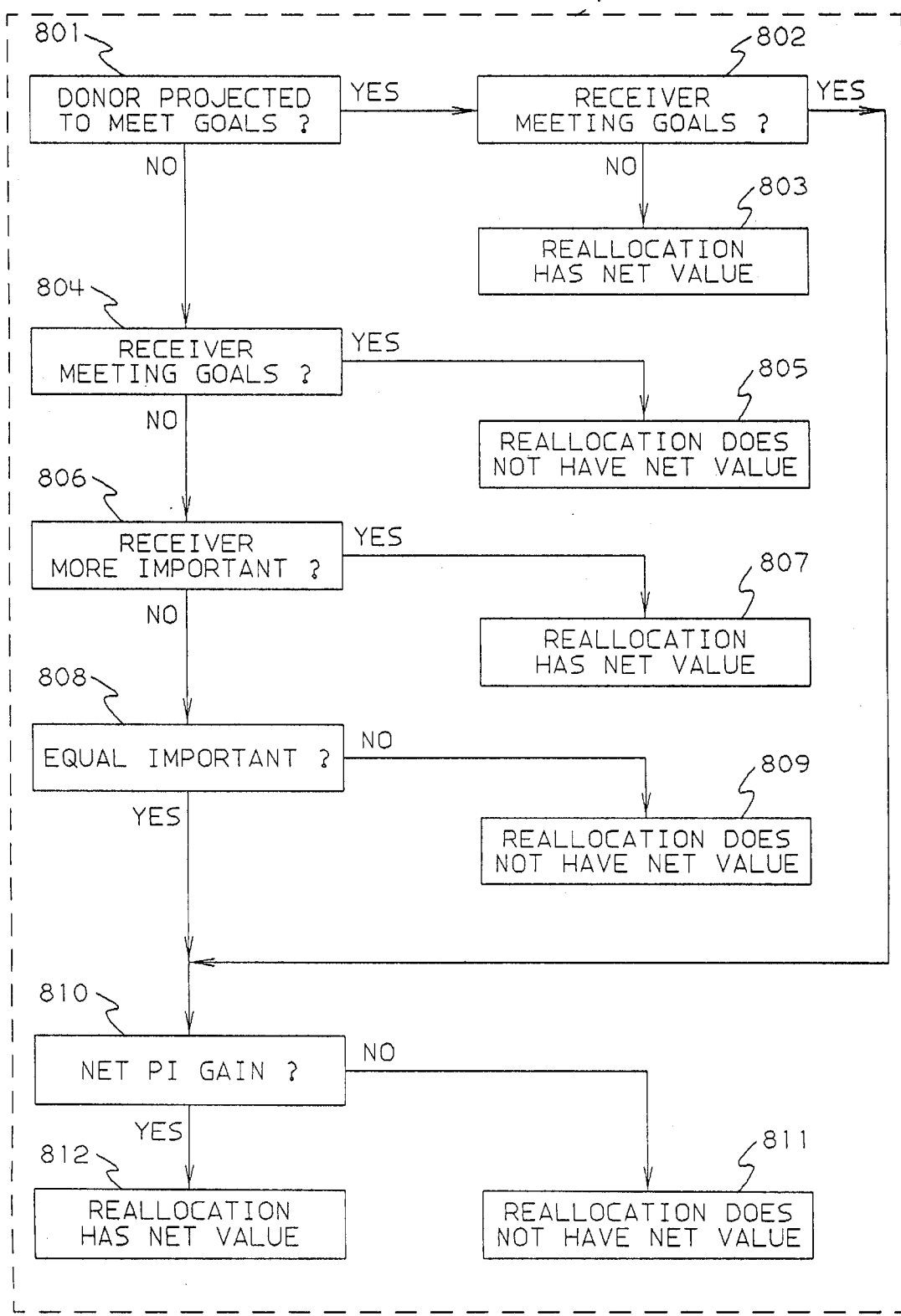
FIG. 8 is a flow chart showing the general logic flow for the assess-net-value function for proposed changes.

FIG. 8 illustrates the steps used by the assess net value means (1424) to determine the net value of a contemplated reallocation of resources between the receiver and the donor. If the resource donor is projected to meet its goal (801) and the receiver is missing its goal (802), the reallocation has net value (803). Note that on the MGDPC multi-system pass a goal class is considered to be meeting goals if its multi-system performance index is less than or equal to 1. On the MGDPC local pass a goal class is considered to be meeting goals if both its multi-system and local performance indexes are less than or equal to 1.

If the donor is projected to miss its goal and the receiver is meeting its goal the action does not have net value (805). If both the donor and the receiver are missing goals, the reallocation has net value if the receiver is more important (as indicated by the importance value (108)) than the donor (807) and does not have net value if the donor is more important the receiver (809). At (810) either both the receiver and donor are missing goals and are equally important, or both are meeting their goals. In this case the reallocation has net value if it causes a net multi-system performance index (PI) gain. On the MGDPC local pass, the reallocation must also have a net local performance index gain. A resource reallocating has a net performance index gain if both of the following conditions are true:

1. The projected performance index value decrease (performance improvement) for the receiver is more than the projected performance index value increase (performance degradation) of the donor.

2. If the receiver is projected to have a lower performance index value (better performance) than the donor, the receiver's performance index value must be projected to be closer to the donor's performance index value after the reallocation than before.

For item 1 above, when comparing the projected performance index decrease of the receiver to the projected performance index increase of the donor, the receiver only gets credit for the part of its performance index value decrease above 0.90. Similarly, the donor only gets credit for the part of its performance index value increase above 0.90. For example, if the receiver's performance index value was projected to improve from 1.50 to 0.70, the performance index decrease used in the comparison would be 0.60.

RECEIVER VALUE

Checking for sufficient receiver value is an optimization. A receiver is only helped when there is projected to be sufficient receiver value. Receiver value is either a minimum performance index improvement criterion or a minimum delay samples delta criterion. In the preferred embodiment, for example, the receiver value criterion requires an improvement of at least 10 percent of the difference between the receiver's current performance index and 1.00 or a delay sample delta at least equal to half the delay samples of the largest delay experienced by the receiver. These criteria are designed to reject very small improvements. The reason for rejecting actions having too little receiver value is to avoid making changes that yield only marginal improvements.

CPU DELAY

This section describes improving performance by reducing the CPU delay (1420) experienced by the receiver.

Figure 9:
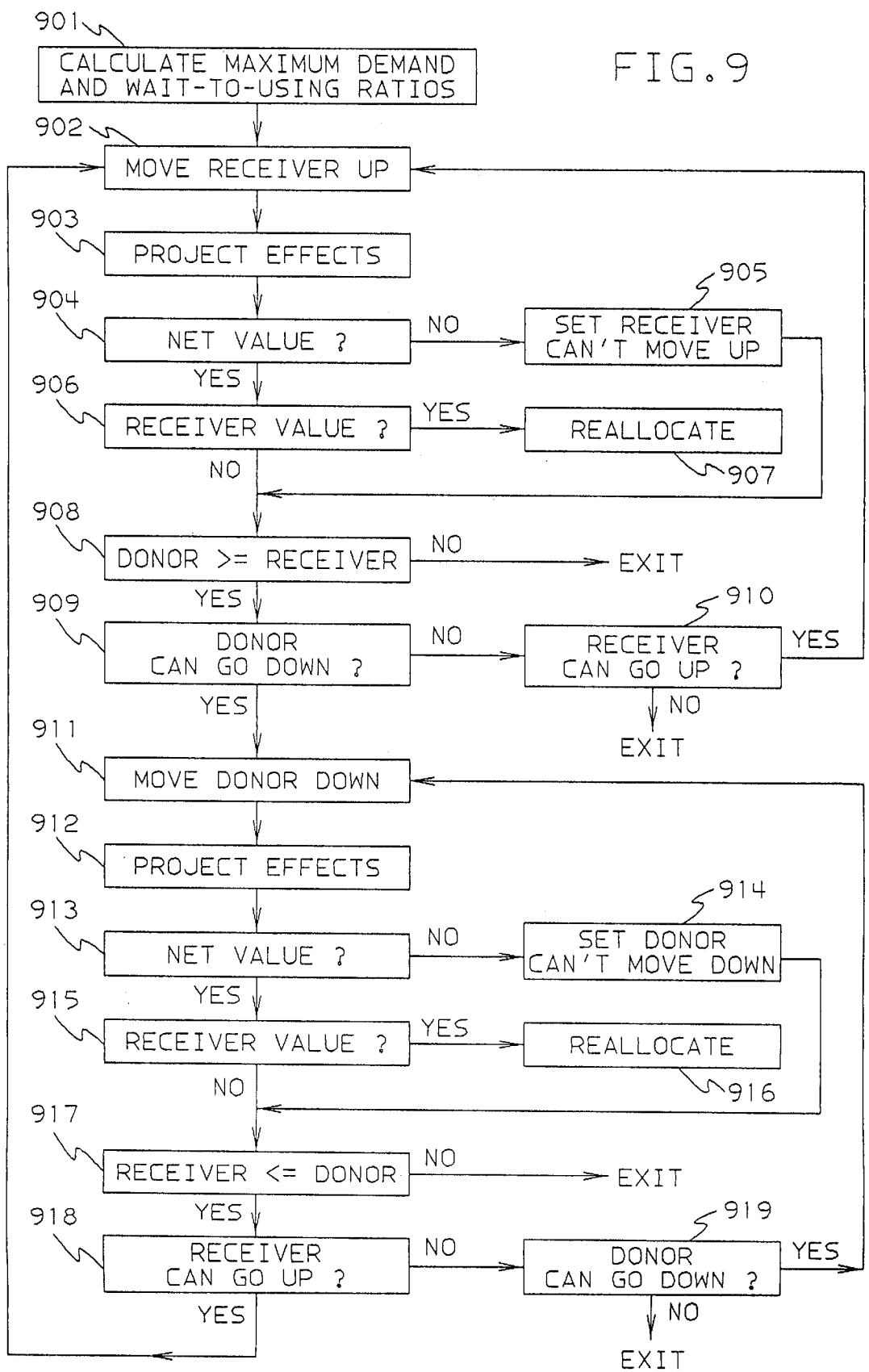
FIG. 9 is a flow chart of the steps to assess improving performance by increasing dispatch priority.

FIG. 9 illustrates the steps to find a new set of dispatching priorities to be used to improve the receiver's performance without inequitably harming the donor's performance. FIGS. 9–13 provide the steps involved in making the performance index delta projections provided by the fix means (1418) to assess net value means (1424).

At (901), the maximum demand and wait-to-using ratios are calculated for each goal class and accumulated for all the goal classes at each priority. These calculations are described later in this specification. A table of these values is constructed where each row represents the dispatch priority and the two columns are the wait-to-using ratio and the maximum demand, accumulated for all the performance goal classes at the corresponding dispatch priority value. This table is called the wait-to-using table and is used to project new wait-to-using values for a new dispatch priority, as described later. Wait-to-using ratios (CPU delay samples divided by CPU-using samples) are a well known concept in computer systems performance measurement. Maximum demand is new. Maximum demand is the theoretical maximum percentage of total processor time that the work units associated with a goal class can consume if there is no CPU delay. The maximum demand calculation is shown later in this specification.

Figure 10:
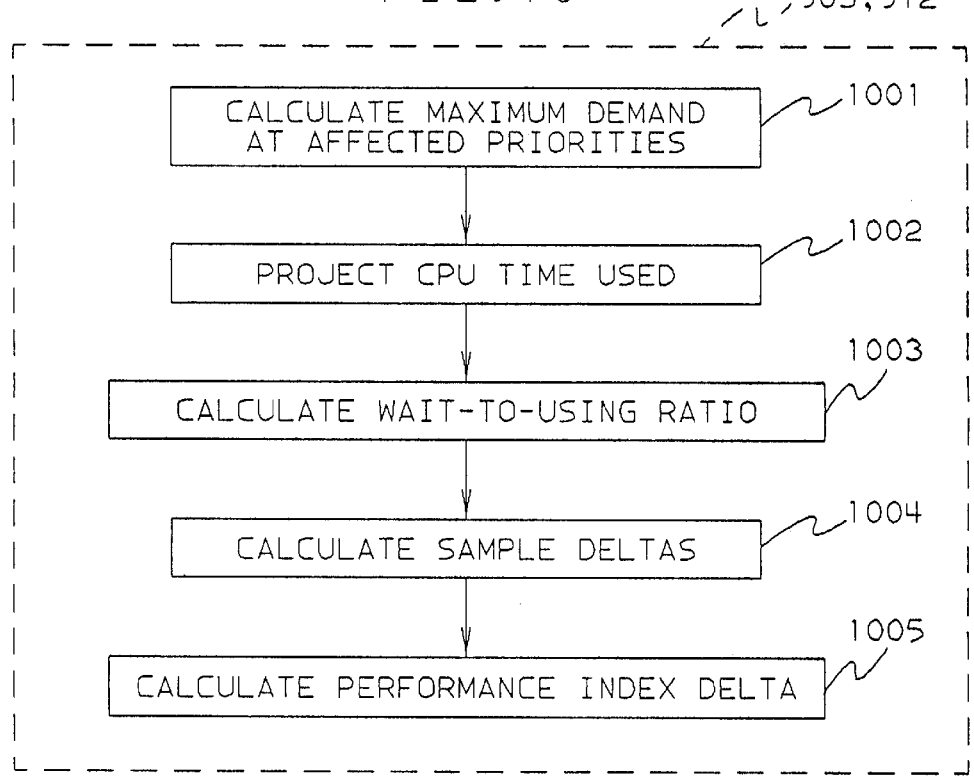
FIG. 10 is a flow chart showing logic flow for projecting the effects of changing dispatching priorities.

Steps (902) through (909) illustrate the process of alternately assessing the result of increasing the receiver's dispatching priority (moving the receiver up) and decreasing the donor's dispatching priority (moving the donor down) until the combination of moves produces sufficient receiver value or insufficient net value. The steps to project the effects of a move (903 and 912) are illustrated in FIG. 10. The net value check is shown in FIG. 8. If either net value check fails, secondary donors and receivers are selected to be moved up with the receiver or down with the donor to determine whether that combination of moves will pass the net value check.

If the combination of moves passes the net value check, secondary receivers and donors are moved along with the primary receiver and donors. Secondary donors and receivers are not found via the select donor means and the select receiver means; instead, secondary receivers are defined as those performance goal classes: 1) having a dispatch priority below the dispatch priority of the primary receiver and, 2) that failed the net value check. Analogously, secondary donors are those performance goal classes: 1) having a dispatch priority above the dispatch priority of the primary donor, and 2) that failed the net value check.

MAXIMUM DEMAND CALCULATION

Maximum demand is calculated as follows:

$$maximum\ demand\ percentage = \frac{(number\ of\ work\ units) \times (CPU\text{-}using\ samples) \times (100)}{(total\ samples\ for\ all\ delay\ types) - (CPU\ delay\ samples)}$$

Maximum demand is the theoretical maximum percentage of total processor time a goal class can consume if it has no CPU delay.

ASSESS PRIORITY CHANGES

FIG. 10 illustrates the steps to project the effects of changing dispatching priorities. At (1001), the maximum demand of the performance goal class whose dispatch priority is to be changed is subtracted from the maximum demand at its "from" (current) priority and added to the maximum demand at its "to" (proposed near) priority. At (1002), the CPU time projected to be used by each class affected by the dispatch priority change is projected by reading from a graph the achievable demand percentage for each class, and then multiplying the achievable demand percentage by the total time available in the system. At (1003) new wait-to-using ratios are projected, at (1004) CPU-using and delay sample deltas are calculated, and at (1005) a performance index delta is calculated for each performance goal class affected by the change in dispatch priority.

ACHIEVABLE DEMAND GRAPH

Figure 11:
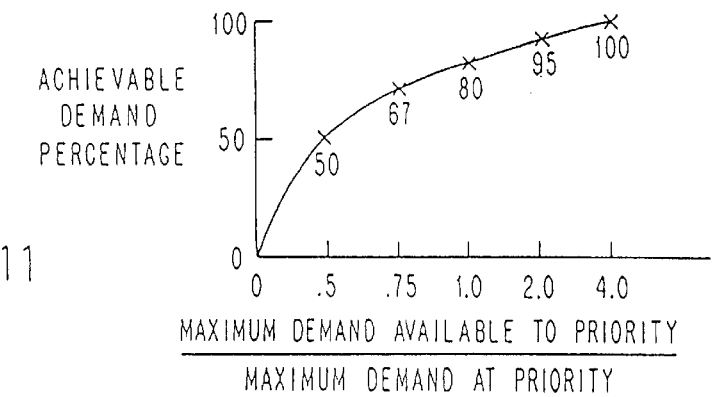
FIG. 11 is a sample graph of achievable demand.

FIG. 11 shows the achievable demand graph. The abscissa value is the quotient of the maximum demand available to a dispatch priority, divided by the total maximum demand at that dispatch priority. The maximum demand available to a dispatch priority is 100 minus the cumulative maximum demand at all dispatch priorities above the subject performance goal class dispatch priority. The maximum demand available to a dispatch priority cannot be less than zero in this calculation. The maximum demand at a dispatch priority is the total maximum demand for all classes at that dispatch priority.

The ordinate value of the achievable demand graph is the achievable demand percentage. The achievable demand percentage is the percentage of the maximum demand of a class that the class is projected to consume, given the maximum demand of all work at higher dispatching priorities and the maximum demand of all work at the same priority.

To project the CPU time to be used, the achievable demand percentage for a class is read off the achievable demand graph. The achievable demand percentage is used to project processor time consumption. CPU time consumption is calculated by multiplying achievable maximum demand by the maximum demand of the class times total CPU time.

The achievable demand graph differs from the others used in the present invention by the fact that all values for this graph are hard coded. For all the other graphs, observations of real data from the running system are used. The values for the achievable demand graph were derived from modeling.

CPU WAIT-TO-USING RATIO

Figure 12:
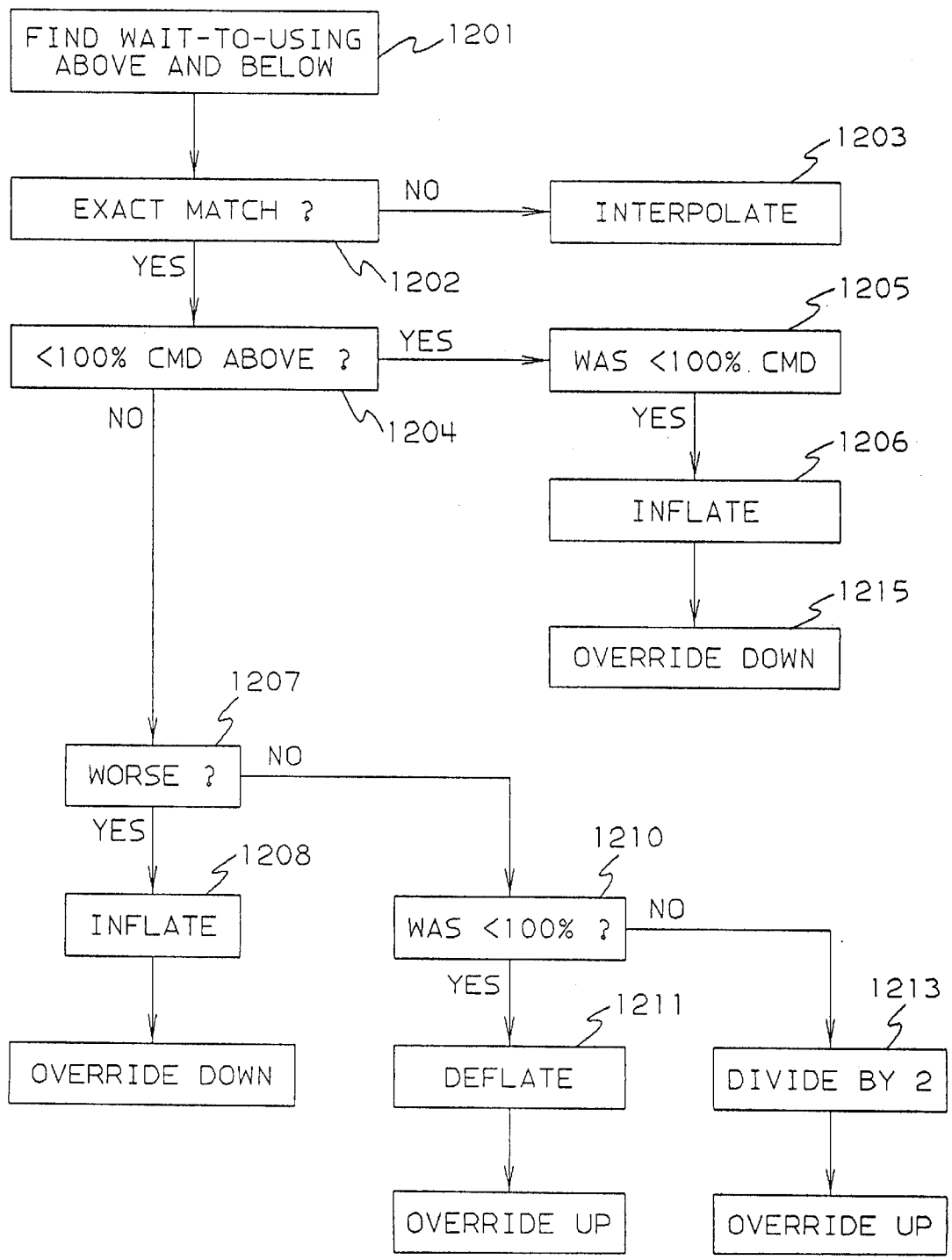
FIG. 12 is a flow chart for calculating a new wait-to-using ratio.

FIG. 12 illustrates calculating a new wait-to-using ratio using the wait-to-using table constructed as described earlier. The actual and projected wait-to-using ratios are used to calculate a new delay sample delta.

At (1201), the wait-to-using ratios at the nearest cumulative maximum above and below the projected cumulative maximum demand at the dispatching priority of interest are found in the wait-to-using table. If an exact match for the new cumulative maximum demand is not found in the table (checked at 1202), the wait-to-using ratios at the maximum demands above and below are interpolated to get the new wait-to-using ratio to use (1203). If an exact match is found, that wait-to-using ratio is used.

If there is projected to be greater than 100% cumulative maximum demand above the dispatching priority of interest (1204), and there was less than 100% cumulative maximum demand (1205), the wait-to-using ratio is inflated by one-half the ratio of maximum demand that could have been consumed and the maximum demand that is projected to be consumed at the dispatching priority (1206).

If there is not projected to be greater than 100% cumulative maximum demand above the dispatching priority of interest (1204), and this cumulative maximum demand is worse than it was projected to be for the current dispatching priority (1207), the wait-to-using ratio is inflated by one-half the ratio of maximum demand that could have been consumed and the maximum demand that is projected to be consumed at the proposed dispatching priority (1208).

If there is not projected to be greater than 100% cumulative maximum demand above the dispatching priority of interest (1204), and this cumulative maximum demand is not worse than it was before (1207), and there was less than 100% cumulative maximum demand above (1210), then the wait-to-using ratio is deflated by the ratio of maximum demand that could have been consumed and maximum demand that is projected to be consumed at the priority (1211).

If there is not projected to be greater than 100% cumulative maximum demand above the dispatching priority of interest (1204), and this demand is not worse than it was for the current dispatching priority (1207), and there was not less than 100% cumulative maximum demand above (1210), the wait-to-using ratio is deflated by dividing it by 2 (1213).

In all inflation cases, if the inflated value is greater than the actual wait-to-using ratio at the next lower priority, then the wait-to-using ratio is overridden to the wait-to-using ratio at the next lower priority. If the deflated value is less than the actual wait-to-using ratio at the next higher priority, the wait-to-using ratio is overridden to the wait-to-using ratio at the next higher priority.

The wait-to-using ratio derived from the wait-to-using table described earlier is further adjusted for each individual performance goal class as follows:

$$\text{W2U(adjusted)} = \text{W2U(from table)} \times (A/B)$$

where

A=service-weighted average mean-time-to-wait at priority

B=individual performance goal class mean-time-to-wait

CPU-USING SAMPLE DELTA

FIG. 13 shows the logic flow for calculating CPU-using sample deltas. If the CPU time was accumulated for the performance goal class (checked at 1301), the projected CPU-using samples are set equal to the actual CPU-using samples, multiplied by the projected CPU time divided by the actual CPU time (1303). If the CPU time was not accumulated for the performance goal class, the projected using samples are set equal to the projected CPU time divided by the CPU time per sample (1302). The using sample delta is the projected samples minus the actual samples.

CPU DELAY SAMPLE DELTA

CPU delay sample deltas are calculated as follows:

$$(\text{projected delay samples}) = \frac{(\text{actual delay samples}) \times (\text{projected wait-to-using})}{(\text{actual wait-to-using})}$$

The projected delay samples are equal to the actual observed delay samples times the projected wait-to-using ratio divided by the actual wait-to-using ratio. The delay sample delta is equal to the projected samples minus the actual samples.

CPU PERFORMANCE INDEX DELTA

Performance index deltas are calculated for dispatching priority changes as shown below. Note: these equations go both ways for receivers and donors because the CPU-using and delay sample deltas are signed numbers. Also note that the sample deltas calculated above are for the local system.

response time goals:

$$(\text{proj local response time delta}) = \frac{(\text{delay samples delta}) \times (\text{actual local response time})}{(\text{local non-idle samples})}$$

$$(\text{projected local performance index delta}) = \frac{(\text{projected response time delta})}{(\text{goal})}$$

$$(\text{projected multi-system performance index delta}) = \frac{(\text{\# of local completions}) \times (\text{proj local performance index delta})}{(\text{\# of total completions across all systems})}$$

execution velocity goals:

$$(\text{new multi-system velocity}) = \frac{(\text{multi-system CPU-using}) + (\text{using delta})}{(\text{multi-system non-idle samples}) + (\text{using delta}) + (\text{CPU delay delta})}$$

$$(\text{multi-system performance index delta}) = \frac{(\text{current multi-system performance index}) - (\text{velocity goal})}{(\text{new multi-system velocity})}$$

$$(\text{new local velocity}) = \frac{(\text{local CPU-using}) + (\text{using delta})}{(\text{local non-idle samples}) + (\text{using delta}) + (\text{CPU delay delta})}$$

$$(\text{local performance index delta}) = \frac{(\text{current local performance index}) - (\text{velocity goal})}{(\text{new local velocity})}$$

CAP BIT MANIPULATOR

The operation of cap bit manipulator (130) is similar to the well known time slicing function of the system resource manager (123). A length of time (the length is dependent on processor speed), is divided into a number of intervals, 64 in the preferred embodiment. An indicator corresponding to each of the 64 intervals indicates whether the resource group should be capped during the interval. These indicators form the cap slice pattern (122) and are set by the adjust capping means (128) of MGDPC (126). When the cap bit manipulator (130) is invoked, it checks which resource groups should be capped and sets the cap bits (105) accordingly in the ASCBs (104) for the work units.

RESOURCE GROUP DATA

FIG. 15 illustrates the resource group table entry data used to determine the amount of time that units of work in resource groups should be capped. The resource group name is stored at (118). This name is used to correlate the processor resource consumption data sent from the remote systems and to associate user performance goal classes with resource groups. The resource group name for the resource group to which a goal class belongs is stored in the user performance goal class table entry. The processor consumption maximum specified for the resource group (107) is stored at (119). The total processor service units consumed by all work units in the resource group should not exceed this maximum. This is the total for all work units executing on the local and all remote systems (100-A, 100-B, 100-C). Resource group maxima span multiple systems. The resource group names and processor resource consumption maxima are input values.

The group processor consumption (120) and cap slice data (122) used in calculations is kept over a moving window of time. The moving window of time is defined as the most recent 60 seconds. The 60 second window is divided into 6 intervals of 10 seconds each, referred to as 6 window panes, and implemented as a six-element array for each window. In the preferred embodiment there are three windows of data: one for the processor service consumed on the local system (120), a second for the processor service consumed on the sum of all the remote systems (121), and a third window for the cap slices on the local system (122).

Data for the current 10-second interval is stored in the window pane array element indexed by the current window pane index (1503). Each window array has six window pane array elements. The six array elements are used in rotation. After the sixth element is used, data for the next time interval is stored in the first element, replacing the old data that was in the first array element. The data used in computations is the sum of the data in all the window panes of the window, that is, the six intervals of data.

The current window pane index (1503) for the resource group is stored in the group table entry. Processor service units data (120) is kept over a window of time, six ten-second intervals in the preferred embodiment. The current window pane index (1503) indicates which window pane should be used for the current data. It is an important feature of the present invention that data is kept over a number of intervals (six ten-second intervals in the preferred embodiment). This feature smooths out the data and eliminates the need for synchronization among the systems being managed. This window covers enough time such that late or out-of-order remote data does not require special handling or error processing. The late data is just added into the window data whenever it arrives. If a system fails and the data stops arriving, the data for that system simply stops being included and stops being used in decisions. This process eliminates the need for special case and error handling mechanisms and reduces the possibility of abrupt changes in resource allocations on individual systems.

The number of cap slices (122) computed for a resource group for the previous six intervals are stored in six window panes. The cap slice values are filled-in by the adjust capping means (128). The number of processor service units consumed locally (120) and remotely (121) at each importance is kept for the last six intervals in six window panes. The processor service units consumption data from the remote systems is filled-in by the remote data receiver (125). The local and total processor service units, by importance, over the window (1506) and the total processor service units over the window (1507) are stored in the group table entry (117). These values are computed and used by the adjust capping means (128).

An indicator of whether the local system has work at each importance (1508), together with the number of remote systems that have work at each importance (1509) are stored in the group table entry (117). This indicator (1508), together with the processor service units consumption data (120), is sent by the local system to all remote systems by the send data means (129). The indicators are received and stored by the remote data receiver means (125).

The specific slices when work units in the group should be capped are indicated in the cap slice pattern stored at (122). These bits are set by the assign cap slices means.

ADJUST CAPPING

For the present invention, MGDPC (126) has been modified to perform the new function of adjusting capping. The adjust capping means (128) determines the amount of time that work units assigned to each resource group should be made non-dispatchable (capped) to limit resource consumption to the maximum specified for that resource group. The new adjust capping means (128) of MGDPC (126) is illustrated in FIG. 16, described later. The send data means (129) has been modified to additionally send processor resource consumption data by resource group. The additional data sent is the local processor service units consumption by importance (1801) and an indicator of whether the local system has work at each importance (1802).

Each system has available to it, by resource group, the processor service consumption by importance for the local and all remote system. Each system can determine from the measured processor consumption and the installation-specified maximum processor consumption how much the processor consumption should be reduced on all systems to cause the total processor consumption to be no more than that maximum. Using the processor consumption data by importance, each system works its way down the importance levels determining how much of the processor service consumed at a given importance should continue to be allocated on the local system. If all the measured processor service consumption at a given importance is below the maximum, then all the processor service consumed at that importance on the local system is added to the amount of processor service to be allowed on the local system. If not all the processor service consumed at that importance, when combined with the processor service allocated at higher importance, is below the maximum, then only the proportional amount of processor service consumed at that importance on the local system is added to the total processor service to be allowed on the local system. This process results in an equitable, by importance, capping across systems. This process is illustrated in FIG. 16.

If less than the maximum amount of processor service is being consumed, the additional amount of processor service is also allocated across the systems based on the importance of the work running on each system. The number of processor service units allowed on the local system is then converted to a number of cap slices (FIG. 16) and a cap slice pattern (FIG. 17).

The adjust capping means (128) runs periodically (every ten seconds in the preferred embodiment) on each system to adjust the number of cap slices on the local system to compensate for changing conditions. For example, if work units assigned to a resource group in one system stop demanding service, work units assigned to the same resource group on other systems can be allowed to consume more. It is important to note that each system can independently determine how much to limit each resource group on the local system. No central coordination is required. Each system has enough information to make the decision on how many cap slices are required on the local system.

FIG. 16 illustrates the control flow used to determine, by resource group, the amount of time that units of work should be capped. At (1601) a check is made to determine whether there is another resource group to process. If not, the function is complete and control flows to (1602) to set the window pane index to the next window pane and exit. The window pane index is set to the next window pane to use by adding 1 to the current window pane index and checking whether the new window pane index is greater than 6. If the new window pane index is greater than 6, the new window pane index is set to 1. If there is another resource group to process, a check is made at (1603) to determine whether the resource group either has cap slices set currently or is currently consuming more processor time than the specified maximum. If not, control flows to (1601) to process the next resource group. If yes, control flows to (1604) where initialization is done.

Initialization consists of setting the variable RSA, which represents the remaining processor service units that may be allocated to the resource group, to the maximum specified for the resource group, and setting the variable LSA, which represents the processor service units allowed to be consumed on the local processor, to zero. The processor service units allowed on the local processor is apportioned based on the consumption and importance of work on the local and all remote processors. The array variables LS and TS are also initialized at (1604). LS and TS are arrays with the number of elements equal to the number of levels of importance. For each importance, the variable LS(IMP) is set to the total service consumed at that importance on the local system over the most recent window of time. This is done by adding the service consumption data at that importance from the six elements of the local processor service-consumed window. The variables TS(IMP), the total service consumed at each importance, are calculated similarly.

At (1605) the importance variable (IMP) is set to the highest importance to initialize for looping by importance through the processor service units data. At (1606) a check is made to determine whether there are any processor service units that may still be apportioned. If all the processor service units have been apportioned, control flows to (1616) where the number of processor service units apportioned to the local processor is converted to a number of cap slices (130).

If there are still processor service units that remain to be apportioned without exceeding the specified maximum, control flows to (1607) where a check is made to determine whether the total amount of processor service units consumed, TS, at the current importance, IMP, on the local plus all the remote systems is less than the processor service units that remain to be apportioned. If the total of processor service units consumed on all systems at the current importance is less than or equal to the processor service units that remain to be apportioned, control flows to (1608) where the number of processor service units consumed on the local system, LS, at the current importance, IMP, is added to the number of local processor service units allowed, LSA. If the total of processor service units consumed at the current importance is greater than the processor service units that remain to be allocated, control flows to (1609) where a fraction of the remaining processor service units allowed is allocated to the local system. The fraction of the remaining processor service units allocated to the local system is the number of processor service units consumed at the current importance on the local system divided by the total processor service units consumed at the current importance on the local system, plus all remote systems.

In either case control next flows to (1610) where the total number of processor service units consumed on the local system, plus all remote systems, TS(IMP), is subtracted from the number of processor service units remaining to be allocated, RSA. Next, at (1611) a check is made to determine whether there is another importance to process. If yes, control flows to (1612) where the current importance variable, IMP, is set to the next lower importance and then control flows back to (1606) to check whether there are more processor service units to be apportioned, as described previously.

If at (1611), it is determined that all the importance values have been processed, and control flows to (1613) where a check is made to determine whether the resource group was consuming less than its maximum allowed processor service units. If the resource group was not consuming less than its allowed maximum processor service units, control flows to (1616) to calculate the cap slices for the resource group. If the resource group was consuming less than its maximum processor service units control flows to (1614) where a check is made to determine whether the local system has any work at the highest importance of any work in the resource group on any system. The additional processor service units are apportioned to the systems that have work at the highest of the importance of the work in the resource group. If the local system does not have any work at the highest importance for work in the resource group, control flows to (1616) to calculate the cap slices for the resource group. If the local system does have work at the highest importance for work in the resource group, a fraction of the remaining processor service units that may be allocated is apportioned to work on the local system. The fraction apportioned to work on the local system is 1 divided by the number of systems that have work at the highest importance (1509).

At (1616), the number of processor service units allowed on the local system is converted to a number of cap slices using the following steps.

1. Calculate the number of non-cap slices allowed as follows:

$$non\text{-}cap\text{-}slices = LSA * (TSLOW - CSLOW) / LSEROW$$

where:
    LSA—local processor service units allowed
    TSLOW—total number of slices over window
       (6*64=384, a constant)
    CSLOW—number of capped slices over window (1502)
    LSEROW—local processor service units consumed over
       window (1504)

2. If non-cap-slices calculates to 0, set it to 1. Never cap 100% of the time.

3. Set cap slices equal to total slices (64) minus non-cap slices.

4. If the increase in cap slices is more than half the total number of slices, increase the number of cap slices by half the total number of slices.

5. Store the number of cap slices in the resource group table entry (122). The number of cap slices is stored in the cap slice array element indexed by the current window pane index.

ASSIGN SPECIFIC CAP SLICES

FIG. 17 illustrates the steps to spread the cap slices for each resource group relatively evenly over the cap slice pattern for the cap bit manipulator means to interrogate. The resource group having the largest number of capped slices is assigned specific slices first, then the resource group needing the next largest number of cap slices, and then the next, until all resource groups having cap slices have been processed. On a system-wide basis, the same number of resource groups ±1 group are capped during each of the 64 slices in the cap slice pattern by keeping a count of the number of resource groups that are to be capped during each slice as specific slices are assigned to specific resource groups. This count is tested to determine whether the group should be assigned a specific slice. No slice is assigned to two resource groups until all 64 slices have been assigned once. No slice is assigned to three groups until all 64 slice have been assigned twice, and so on.

At (1701), system data is initialized. The cap slice count array (SCA) elements are cleared to zero. The slice count array is an array of counts. Each entry contains the number of groups that are capped during that slice. There are 64 entries in the cap slice count array. Each entry represents $\frac{1}{64}$th of the time.

At (1702), the resource group with the largest number of cap slices that has not already been processed is selected. If there are no more resource groups to process, control flows to exit at (1703). If there is another resource group to process, control flows to (1704).

At (1704), resource group data is initialized. The slice increment (SI), slice count criteria (SCC), and slice count array index (SCAI) are initialized. (SI-1) is the number of slices that can be skipped between each cap slice for the resource group such that the resource group's cap slices are spread relatively evenly over the 64 possible cap slices. SI is set to 64 divided by the group's number of cap slices. SCC is set to the maximum value in the slice count array. If all the counts in the slice count array have the same value, 1 is added to SCC. The SCAI is set to 1 to start at the first slice in the cap slice pattern.

At (1705), the count in the SCA(SCAI) cell is checked against the criteria (SCC) for this group. If the slice has been assigned to SCC number of groups or has already been assigned to this group, control flows to (1706) where 1 is added to SCAI. When SCAI is incremented to 65, it is reset back to 1 (that is, SCAI is modulo 64). If all the counts in the slice count array have the same value, 1 is added to SCC. Control then flows back to (1705).

If the slice has been assigned to less than SCC number of resource groups and has not been assigned to the current group being processed, control flows to (1707) where the slice is assigned to the group and 1 is added to the use count for the slice in the SCA. The slice is assigned to the resource group by setting the bit corresponding to SCAI in the resource group's cap slice pattern. Control then flows to (1708).

At (1708) a check is made to determine whether another slice must be assigned to the current resource group. If specific slices have been assigned for all the group's cap slices, control flows back to (1702) to check for another resource group. If the group needs another specific slice assigned, control flows to (1709).

At (1709), SI is added to SCAI to set the next specific slice to check. If SCAI is greater than 64, 64 is subtracted from SCAI. If all the counts in the SCA have the same value, 1 is added to SCC. Then control flows back to (1705).

Upon a reading of the present disclosure, it will be apparent to the skilled artisan that other embodiments of the present invention beyond those embodiments specifically described herein may be made or practiced without departing from the spirit of the invention. It will also will be clear to the skilled artisan that numerous equivalent elements may be substituted for elements expressly disclosed herein as a part of a functional limitation described or claimed in means-for terms. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

What we claim as new is:

1. An apparatus for managing processor resources of a distributed data processing system, said distributed data processing system comprising a plurality of independent and cooperating data processing systems, said apparatus comprising:

a) at least two data processing systems of said plurality of independent and cooperating data processing systems executing a workload of said distributed data processing system, each data processing system of said at least two data processing systems comprising an instance of an operating system, said workload comprising a plurality of work units, at least a portion of said plurality of work units being organized into one or more resource groups, wherein at least one resource group of said one or more resource groups has associated therewith at least one processor consumption maximum accessible by and common to said at least two data processing systems, and wherein at least one work unit of said plurality of work units has at least one importance level associated therewith; and b) system resource manager means for managing system resources across said at least two data processing systems according to said at least one processor consumption maximum and said at least one importance level, said system resource manager means comprising:

i) means for determining, by one or more data processing systems of said at least two data processing systems, local processor consumption data of work units executing on said one or more data processing systems, wherein said means for determining provides local processor consumption data for each data processing system of said one or more data processing systems based on one or more resource groups associated with work units executing on that data processing system and one or more importance levels within the one or more resource groups;

ii) remote data receiver means for receiving, by said one or more data processing systems, remote processor consumption data from at least one data processing system other than the data processing system receiving the data, wherein said remote processor consumption data is based on one or more resource groups associated with work units executing on said at least one data processing system and one or more importance levels within the one or more resource groups;

iii) multi-system goal driven performance controller means, responsive to the remote processor consumption data and said local processor consumption data, for adjusting at least one system control parameter on at least one data processing system of said one or more data processing systems to cause a change to processor consumption of one or more work units executing on the at least one data processing system; and iv) capping means, responsive to the at least one adjusted system control parameter, for capping on said at least one data processing system processor consumption of the one or more work units for a proportion of time, wherein the at least one processor consumption maximum is not exceeded by processor consumption of an aggregate of one or more work units, associated with said at least one processor consumption maximum, executing across the at least two data processing systems.

2. The apparatus of claim 1, in which said capping means comprises:

a) calculating means for determining the proportion of time for which each resource group of said at least one resource group should be capped;

b) means for creating a cap slice pattern for said each resource group, in accordance with the proportion of time determined for that resource group;

c) means responsive to said cap slice pattern for setting indicators indicating which work units should be capped; and d) means responsive to said indicators for controlling dispatching according to said indicators.

3. The apparatus of claim 2, in which said calculating means comprises:

a) means for calculating service units allowed on a local data processing system; and b) means to convert said service units to said proportion of time.

4. The apparatus of claim 1 in which said processor consumption maxima comprise processor service units.

5. A method of managing processor resources of a distributed data processing system, said distributed data processing system comprising a plurality of independent and cooperating data processing systems, said method comprising:

a) executing across at least two data processing systems of said plurality of independent and cooperating data processing systems a workload of said distributed data processing system, each data processing system of said at least two data processing systems comprising an instance of an operating system, said workload comprising a plurality of work units, at least a portion of said plurality of work units being organized into one or more resource groups, wherein at least one resource group of said one or more resource groups has associated therewith at least one processor consumption maximum accessible by and common to said at least two data processing systems, and wherein at least one work unit of said plurality of work units has at least one importance level associated therewith; and b) managing system resources across said at least two data processing systems according to said at least one processor consumption maximum and said at least one importance level, said managing comprising:

i) determining, by one or more data processing systems of said at least two data processing systems, local processor consumption data of work units executing on said one or more data processing systems, wherein said determining provides local processor consumption data for each data processing system of said one or more data processing systems based on one or more resource groups associated with work units executing on that data processing system and one or more importance levels within the one or more resource groups;

ii) receiving, by said one or more data processing systems, remote processor consumption data from at least one data processing system other than the data processing system receiving the data, wherein said remote processor consumption data is based on one or more resource groups associated with-work units executing on said at least one data processing system and one or more importance levels within the one or more resource groups;

iii) responsive to the remote processor consumption data and said local processor consumption data, adjusting at least one system control parameter on at least one data processing system of said one or more data processing systems to cause a change to processor consumption of one or more work units executing on the at least one data processing system; and iv) responsive to the at least one adjusted system control parameter, capping, on said at least one data processing system, processor consumption of the one or more work units for a proportion of time, wherein the at least one processor consumption maximum is not exceeded by processor consumption of an aggregate of one or more work units, associated with said at least one processor consumption maximum, executing across the at least two data processing systems.

6. The method of claim 5, in which said capping comprises a) determining the proportion of time for which each resource group of said at least one resource group should be capped;

b) creating a cap slice pattern for said each resource group, in accordance with the proportion of time determined for that resource group;

c) responsive to said cap slice pattern, setting indicators indicating which work units should be capped; and d) responsive to said indicators, controlling dispatching according to said indicators.

7. The method of claim 5, in which said at least one processor consumption maximum comprises processor service units.

8. The method of claim 6, in which said determining the proportion of time comprises calculating service units allowed on a local data processing system and converting said service units to said proportion of time.

9. The method of claim 5, further comprising sending, by each data processing system of said one or more data processing systems to at least one data processing system other than the sending data processing system, a local system indicator indicating whether the system has work units at each importance level; and wherein said receiving further comprises receiving a remote system indicator indicating whether said at least one other data processing system has work units at each importance level; and said capping is responsive to said local system indicator and said remote system indicator.

10. The method of claim 5, further comprising allocating available processor resources within a group processor consumption maximum to higher importance work units of the resource group.

11. The method of claim 8, wherein the calculating service units allowed on a local data processing system comprises apportioning service units by resource group based upon processor consumption and importance level of executing work units of the resource group on the local data processing system and other data processing systems of said plurality of data processing systems.

12. An apparatus for managing processor resources of a distributed data processing system, said distributed data processing system comprising a plurality of data processing systems, said apparatus comprising:

a) at least two data processing systems of said plurality of data processing systems executing a workload of said distributed data processing system, each data processing system of said at least two data processing systems comprising an instance of an operating system, said workload comprising a plurality of work units, at least a portion of said plurality of work units being organized into one or more resource groups, wherein at least one resource group of said one or more resource groups has associated therewith at least one processor consumption maximum accessible by and common to said at least two data processing systems, and wherein at least one work unit of said plurality of work units has at least one importance level associated therewith; and b) system resource manager means for managing system resources across said at least two data processing systems according to said at least one processor consumption maximum and said at least one importance level, said system resource manager means comprising:

i) means for determining, by one or more data processing systems of said at least two data processing systems, local processor consumption data of work units executing on said one or more data processing systems, wherein said means for determining provides local processor consumption data for each data processing system of said one or more data processing systems based on one or more resource groups associated with work units executing on that data processing system and one or more importance levels within the one or more resource groups;

ii) remote data receiver means for receiving, by said one or more data processing systems, remote processor consumption data from at least one data processing system other than the data processing system receiving the data, wherein said remote processor consumption data is based on one or more resource groups associated with work units executing on said at least one data processing system and one or more importance levels within the one or more resource groups; and iii) determining means, responsive to the remote processor consumption data and said local processor consumption data, for independently determining by importance levels how much of said at least one group processor consumption maximum to allocate to said one or more data processing systems so that processor consumption for the one or more resource groups for the at least two data processing systems does not exceed the at least one processor consumption maximum.

13. The apparatus of claim 12, further including capping means responsive to said determining means for capping by importance said executing work units on the at least one data processing system.

14. The apparatus of claimed 13, further comprising memory means for storing a group name, the processor consumption maximum, the local processor consumption data, the remote processor consumption data and a cap slice pattern for each resource group; and wherein said capping means comprises a cap bit manipulator responsive to said cap slice pattern.

15. The apparatus of claim 14, wherein said one or more resource groups are definable.

16. The apparatus of claim 15, wherein said method further comprises send data means for sending to at least one data processing system other than the sending data processing system a local system indicator indicating whether the data processing system has work units at each importance level; and wherein said remote data receiver means receives a remote system indicator indicating whether said at least one other data processing system has work units at each importance level; and said determining means is responsive to said local system indicator and said remote system indicator.

17. An apparatus for managing processor resources of a distributed data processing system, said distributed data processing system comprising a plurality of data processing systems, said apparatus comprising:

a) means for measuring processor consumption, by importance level, of work units executing on each data processing system of at least two data processing systems of said plurality of data processing systems to create local processor consumption data by importance for each data processing system, each data processing system of said at least two data processing systems comprising an instance of an operating system;

b) means for receiving, by one or more data processing systems of said at least two data processing systems, processor consumption data by importance from at least one other data processing system to create remote processor consumption data by importance; and c) means, responsive to said local and remote processor consumption data by importance, for adjusting at least one system control parameter on at least one data processing system to independently modify local processor consumption of work units executing on said at least one data processing system, in accordance with importance levels associated with said work units executing on said at least one data processing system to achieve a processor consumption maximum accessible by and common to said at least two data processing systems.

18. The apparatus of claim 17, wherein said processor consumption maximum comprises a common set of installation specified processor consumption maxima, said work units being organized into resource groups, each of which has a processor consumption maximum.

19. A method of managing processor resources of a distributed data processing system, said distributed data processing system comprising a plurality of data processing systems, said method comprising:

a) measuring processor consumption, by importance level, of work units executing on each data processing system of at least two data processing systems of said plurality of data processing systems to create local processor consumption data by importance for each data processing system, each data processing system of said at least two data processing systems comprising an instance of an operating system;

b) receiving, by one or more data processing systems of said at least two data processing systems, processor consumption data by importance from at least one other data processing system to create remote processor consumption data by importance; and c) adjusting at least one system control parameter on at least one data processing system to independently modify local processor consumption of work units executing on said at least one data processing system, in accordance with importance levels associated with said work units executing on said at least one data processing system to achieve a processor consumption maximum accessible by and common to said at least two data processing systems.

20. The method of claim 19, wherein said processor consumption maximum comprises a common set of installation specified processor consumption maxima, said work units being organized into resource groups, each of which has a processor consumption maximum.

21. At least one program storage device readable by a machine tangibly embodying at least one program of instructions executable by the machine to perform method of managing processor resources of a distributed data processing system, said distributed data processing system comprising a plurality of independent and cooperating data processing systems, said method comprising:

a) executing across at least two data processing systems of said plurality of independent and cooperating data processing systems a workload of said distributed data processing system, each data processing system of said at least two data processing systems comprising an instance of an operating system, said workload comprising a plurality of work units, at least a portion of said plurality of work units being organized into one or more resource groups, wherein at least one resource group of said one or more resource groups has associated therewith at least one processor consumption maximum accessible by and common to said at least two data processing systems, and wherein at least one work unit of said plurality of work units has at least one importance level associated therewith; and b) managing system resources across said at least two data processing systems according to said at least one processor consumption maximum and said at least one importance level, said managing comprising:

i) determining, by one or more data processing systems of said at least two data processing systems, local processor consumption data of work units executing on said one or more data processing systems, wherein said determining provides local processor consumption data for each data processing system of said one or more data processing systems based on one or more resource groups associated with work units executing on that data processing system and one or more importance levels within the one or more resource groups;

ii) receiving, by said one or more data processing systems, remote processor consumption data from at least one data processing system other than the data processing system receiving the data, wherein said remote processor consumption data is based on one or more resource groups associated with work units executing on said at least one data processing system and one or more importance levels within the one or more resource groups;

iii) responsive to the remote processor consumption data and said local processor consumption data, adjusting at least one system control parameter on at least one data processing system of said one or more data processing systems to cause a change to processor consumption of one or more work units executing on the at least one data processing system; and iv) responsive to the at least one adjusted system control parameter, capping, on said at least one data processing system, processor consumption of the one or more work units for a proportion of time, wherein the at least one processor consumption maximum is not exceeded by processor consumption of an aggregate of one or more work units, associated with said at least one processor consumption maximum, executing across the at least two data processing systems.

22. The at least one program storage device of claim 21, in which said capping comprises:

a) determining the proportion of time for which each resource group of said at least one resource group should be capped;

b) creating a cap slice pattern for said each resource group, in accordance with the proportion of time determined for that resource group;

c) responsive to said cap slice pattern, setting indicators indicating which work units should be capped; and d) responsive to said indicators, controlling dispatching according to said indicators.

23. The at least one program storage device of claim 21, in which said at least one processor consumption maximum comprises processor service units.

24. The at least one program storage device of claim 22, in which said determining the proportion of time comprises calculating service units allowed on a local data processing system and converting said service units to said proportion of time.

25. The at least one program storage device of claim 21, wherein said method further comprises sending, by each data processing system of said one or more data processing systems to at least one data processing system other than the sending data processing system, a local system indicator indicating whether the system has work units at each importance level; and wherein said receiving further comprises receiving a remote system indicator indicating whether said at least one other data processing system has work units at each importance level; and said capping is responsive to said local system indicator and said remote system indicator.

26. The at least one program storage device of claim 21, wherein said method further comprises allocating available processor resources within a group processor consumption maximum to higher importance work units of the resource group.

27. The at least one program storage device of claim 24, wherein the calculating service units allowed on a local data processing system comprises apportioning service units by resource group based upon processor consumption and importance level of executing work units of the resource group on the local data processing system and other data processing systems of said plurality of data processing systems.

28. At least one program storage device readable by a machine tangibly embodying at least one program of instructions executable by the machine to perform a method of managing processor resources of a distributed data processing system, said distributed data processing system comprising a plurality of data processing systems, said method comprising:

a) measuring processor consumption, by importance level, of work units executing on each data processing system of at least two data processing systems of said plurality of data processing systems to create local processor consumption data by importance for each data processing system, each data processing system of said at blast two data processing systems comprising an instance of an operating system;

b) receiving, by one or more data processing systems of said at least two data processing systems, processor consumption data by importance from at least one other data processing system to create remote processor consumption data by importance; and c) adjusting at least one system control parameter on at least one data processing system to independently modify local processor consumption of work units executing on said at least one data processing system, in accordance with importance levels associated with said work units executing on said at least one data processing system to achieve a processor consumption maximum accessible by and common to said at least two data processing systems.

29. The at least one program storage device of claim 28, wherein said processor consumption maximum comprises a common set of installation specified processor consumption maxima, said work units being organized into resource groups, each of which has a processor consumption maximum.

* * * * *